US006798959B2

(12) United States Patent
Takeuchi et al.

(10) Patent No.: US 6,798,959 B2
(45) Date of Patent: Sep. 28, 2004

(54) DISPLAY DEVICE AND METHOD FOR PRODUCING THE SAME

(75) Inventors: Yukihisa Takeuchi, Nishikamo-Gun (JP); Tsutomu Nanataki, Toyoake (JP); Natsumi Shimogawa, Nagoya (JP); Kazuhiro Yamamoto, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 80 days.

(21) Appl. No.: 10/230,869

(22) Filed: Aug. 29, 2002

(65) Prior Publication Data

US 2003/0063368 A1 Apr. 3, 2003

Related U.S. Application Data

(63) Continuation-in-part of application No. 10/163,212, filed on Jun. 5, 2002.

(30) Foreign Application Priority Data

Sep. 3, 2001 (JP) ........................................ 2001-266355
Aug. 27, 2002 (JP) ........................................ 2002-246683

(51) Int. Cl.$^7$ .......................... G02F 1/295; G02F 1/01; G02B 6/00; G02B 6/26
(52) U.S. Cl. ...................... 385/120; 385/147; 359/290; 365/120
(58) Field of Search ................................ 359/290–293; 365/120; 385/1–8, 31, 121–129, 147

(56) References Cited

U.S. PATENT DOCUMENTS

| | | | |
|---|---|---|---|
| 2,565,514 A | * 8/1951 | Pajes | 359/276 |
| 3,698,793 A | * 10/1972 | Tellerman | 359/290 |
| 3,812,490 A | * 5/1974 | Goodrich | 345/84 |
| 5,106,181 A | * 4/1992 | Rockwell, III | 385/2 |
| 5,636,072 A | 6/1997 | Shibata et al. | |
| 5,771,321 A | 6/1998 | Stern | |
| 5,774,257 A | 6/1998 | Shibata et al. | |
| 5,862,275 A | 1/1999 | Takeuchi et al. | |
| 6,028,978 A | 2/2000 | Takeuchi et al. | |
| 6,211,853 B1 | 4/2001 | Takeuchi et al. | |
| 6,281,868 B1 | 8/2001 | Takeuchi et al. | |
| 6,323,833 B1 | 11/2001 | Takeuchi et al. | |
| 6,381,381 B1 | 4/2002 | Takeda et al. | |
| 6,470,115 B1 | 10/2002 | Yonekubo | |
| 2001/0024555 A1 | * 9/2001 | Takeuchi et al. | 385/120 |

FOREIGN PATENT DOCUMENTS

| | | |
|---|---|---|
| JP | 10-078549 | 3/1998 |
| JP | 2000-075223 | 3/2000 |
| WO | 99/24859 | 5/1999 |

OTHER PUBLICATIONS

U.S. patent application Ser. No. 09/341,151, Takeuchi et al., filed Jul. 1, 1999.
U.S. patent application Ser. No. 09/749,244, Takeuchi et al., filed Dec. 27, 2000.
U.S. patent application Ser. No. 09/749,252, Takeuchi et al., filed Dec. 27, 2000.
U.S. patent application Ser. No. 09/749,265, Takeuchi et al., filed Dec. 27, 2000.
U.S. patent application Ser. No. 10/167,841, Takeuchi et al., filed Jun. 12, 2002.

* cited by examiner

Primary Examiner—Akm Enayet Ullah
(74) Attorney, Agent, or Firm—Burr & Brown

(57) ABSTRACT

A display device comprises an actuator substrate which has actuator elements, an optical waveguide plate, crosspieces which is interposed between the optical waveguide plate and the actuator substrate and which surround the actuator elements, and picture element assemblies which are joined onto the actuator elements. A stack for constructing each of the picture element assemblies has a transparent layer opposed to the optical waveguide plate. The transparent layer contains a major component of a cured resin obtained by polymerization with a principal ingredient which is composed of one or more materials selected from modified epoxy, bisphenol A type epoxy, bisphenol F type epoxy, and glycidyl ether type epoxy, and a curing agent which is composed of one or more materials selected from modified polyamine, modified alicyclic polyamine, and heterocyclic diamine modified product of tertiary amine.

23 Claims, 20 Drawing Sheets

FIG. 7

| OFFSET POTENTIAL | ON SIGNAL | OFF SIGNAL |
|---|---|---|
| | 0V | 60V |
| 10V | −10V (LIGHT EMISSION) | 50V (LIGHT OFF) |

FIG. 8

| TYPE | PRINCIPAL INGREDIENT | | CURING AGENT | |
|---|---|---|---|---|
| A | MODIFIED EPOXY | | MODIFIED POLYAMINE | |
| B | MODIFIED EPOXY | | MODIFIED ALICYCLIC POLYAMINE | MODIFIED POLYAMINE |
| C | BISPHENOL A TYPE EPOXY | | MODIFIED POLYAMINE | |
| D | BISPHENOL A TYPE EPOXY | MODIFIED EPOXY | MODIFIED POLYAMINE | |
| E | BISPHENOL F TYPE EPOXY, GLYCIDYL ETHER TYPE EPOXY | | MODIFIED POLYAMINE | |
| F | BISPHENOL F TYPE EPOXY, GLYCIDYL ETHER TYPE EPOXY | | HETEROCYCLIC DIAMINE MODIFIED PRODUCT OF TERTIARY AMINE | |
| G | BISPHENOL F TYPE EPOXY | | MODIFIED POLYAMINE | |
| H | BISPHENOL F TYPE EPOXY | | HETEROCYCLIC DIAMINE MODIFIED PRODUCT OF TERTIARY AMINE | |

DISPLAY DEVICE AND METHOD FOR PRODUCING THE SAME

CROSS REFERENCE TO RELATED APPLICATIONS

This application is a continuation-in-part application of U.S. Application Ser. No. 10/163,212 filed Jun. 5, 2002, and also claims the benefit of Japanese Application 2001-266,355, filed Sep. 3, 2001, and Japanese Application 2002-246,683, filed Aug. 27, 2002, the entireties of which are incorporated herein by reference.

BACKGROUND OF THE INVENTION

1. Field of the Invention

The present invention relates to a display device and a method for producing the same. In particular, the present invention relates to a display device provided with a substrate which has actuator elements, an optical waveguide plate, crosspieces which is interposed between the optical waveguide plate and the substrate and which surround the actuator elements, and picture element assemblies which are joined onto the actuator elements. The present invention also relates to a method for producing the same.

2. Description of the Related Art

Those hitherto known as the display device include, for example, cathode ray tubes (CRT) and liquid crystal display devices.

Those known as the cathode ray tube include, for example, ordinary television receivers and monitor units for computers. Although the cathode ray tube has a bright screen, it consumes a large amount of electric power. Further, the cathode ray tube involves a problem such that the depth of the entire display device is large as compared with the size of the screen.

The liquid crystal display device is advantageous in that the device is thin, and the display device consumes a small amount of electric power. However, the liquid crystal display device involves such problems that it is inferior in brightness or luminance of the screen, and the field angle of the screen is narrow.

In the case of the cathode ray tube and the liquid crystal display device, it is necessary for a color screen to use a number of picture elements (image pixels) which is three times a number of picture elements used in a black-and-white screen. For this reason, other problems also arise such that the device itself is complicated, a great deal of electric power is consumed, and the cost is high.

In view of the above, in order to solve the problems as described above, a new display device 200 has been suggested. As shown in FIG. 20, the display device 200 comprises an actuator substrate 202, an optical waveguide plate 204, and a plurality of crosspieces 206 allowed to be interposed between the actuator substrate 202 and the optical waveguide plate 204. The optical waveguide plate 204 and the crosspieces 206 are joined to one another by the aid of an adhesive 207. The actuator substrate 202 has actuator elements 208 each of which is displaceable toward the actuator substrate 202 or toward the optical waveguide plate 204 at a position surrounded by the plurality of crosspieces 206. A unit dot 212 is constructed by the actuator element 208 and a picture element assembly 210 which is provided on the actuator element 208. The display device 200 is provided with a plurality of unit dots 212.

In the display device 200 described above, the picture element assembly 210 is softened mainly due to the heat generated, for example, by the driving of the actuator element 208, the light 214 introduced into the optical waveguide plate 204, and the driving circuit related to the image display.

Further, the picture element assembly 210 is continuously pressed to make contact with the optical waveguide plate 204 in accordance with the driving of the actuator element 208. As a result, the concave/convex shape or irregular texture on the surface of the picture element assembly 210, which is formed in order to improve the response characteristics of the picture element assembly 210 to make the contact/separation with respect to the optical waveguide plate 204, is progressively changed to be flat.

The adhesion suppressant, which is previously added to the picture element assembly 210 and which remains even after the curing of resin, gradually seeps out from the picture element assembly 210 in association with the contact/separation operation of the picture element assembly 210 with respect to the optical waveguide plate 204. The adhesion suppressant adheres to the optical waveguide plate 204, resulting in the occurrence of the white defect in which the adhered matter glows white.

As a result, the response performance of the contact/separation of the picture element assembly 210 with respect to the optical waveguide plate 204 may be deteriorated, and the picture element assembly 210 may fail to make separation from the optical waveguide plate 204 any longer to cause the change into the bright defect of such a state that the light is always emitted, or the white defect level on the display may be gradually changed to cause any fluctuation in the image display ability.

Problems will now be enumerated in detail below. In order to stabilize the image display, it is necessary that the surface shape of the picture element assembly 210 is not changed. Specifically, it is necessary that the surface shape is not changed in an atmosphere represented by a temperature (heat resistance) of about 60° C.

The heat resistance (Tg) of the resin after the curing is low in the present resin system (resin system of the picture element assembly 210). Therefore, it is impossible to suppress the change in shape of the resin due to the heat even when the heating treatment is performed beforehand. As a result, when the driving of the actuator element 208 is continued after the heating treatment, the surface shape of the picture element assembly 210 is gradually changed.

When a resin of the thermosetting type is used as the picture element assembly, the heat resistance (Tg) of the resin is improved, if the heating treatment is performed. Therefore, it is inevitable to perform any heating treatment in the process steps. However, if a resin in an uncured state is directly subjected to the heating treatment, there are some problems.

Firstly, the viscosity of the resin and/or the adhesion suppressant in the picture element assembly precursor is strikingly lowered by the heating. Even when the adhesion suppressant seeps out from the resin due to the incompatibility between the resin and the adhesion suppressant, the mutual leveling is consequently caused without forming any concave/convex structure. As a result, the surface shape of the picture element assembly 210 becomes flat.

Secondary, if an adhesion suppressant, which is prepared to have a high viscosity, is added in order to suppress the leveling, the effect to suppress the adhesion may be lowered. Further, it is difficult to wash out the seeped adhesion suppressant having the high viscosity in the washing step to be performed thereafter. The white defect may be caused on the display.

Finally, the resin may be cured without any sufficient seepage of the adhesion suppressant from the resin, the surface shape of the picture element assembly 210 may become flat, and it is impossible to obtain any sufficient effect to cause the release from the optical waveguide plate 204.

Consequently, a delay may occur in the response of the contact/separation of the picture element assembly 210 with respect to the optical waveguide plate 204, or the state (bright defect), in which no separation takes place, may arise.

It has been revealed that the heat resistance of the resin itself has the greatest influence, as the factor to bring about the change in shape of the resin as described above.

The factor to cause the change in level of the white defect on the display includes the fact that the adhesion suppressant, which has remained in an excessive amount in the picture element assembly 210, seeps out to remain on the optical waveguide plate 204. This phenomenon is caused as follows. A large amount of the adhesion suppressant remains in the picture element assembly 210. When the picture element assembly 210 is pressed to make contact with the optical waveguide plate 204 in accordance with the driving of the actuator element 208, the adhesion suppressant gradually seeps out in such a way that the adhesion suppressant is squeezed out to adhere to the optical waveguide plate 204. As a result, the fluctuation of the white defect level on the display (to gradually become white) is caused.

Further, the adhesion suppressant seeps out to the interface between the picture element assembly 210 and the optical waveguide plate 204, and the adhesive force of the adhesion suppressant with respect to the optical waveguide plate 204 is increased by the heating. It becomes impossible to sufficiently remove the adhesion suppressant by means of any simple washing treatment. The adhered matter, which remains on the optical waveguide plate 204, causes the white defect on the image display.

SUMMARY OF THE INVENTION

The present invention has been made taking the foregoing problems into consideration, an object of which is to provide a display device and a method for producing the same in which it is possible to improve the heat resistance of picture element assemblies and it is possible to improve the response performance of the contact/separation with respect to an optical waveguide plate and stabilize the image display.

According to the present invention, there is provided a display device comprising a substrate which has actuator elements, an optical waveguide plate, crosspieces which is interposed between the optical waveguide plate and the substrate and which surround the actuator elements, and picture element assemblies which are joined onto the actuator elements; wherein the picture element assembly includes a layer containing a major component of a cured resin obtained by polymerization with a principal ingredient which is composed of one or more materials selected from modified epoxy, bisphenol A type epoxy, bisphenol F type epoxy, and glycidyl ether type epoxy, and a curing agent which is composed of one or more materials selected from modified polyamine, modified alicyclic polyamine, and heterocyclic diamine modified product of tertiary amine.

The picture element assembly includes the layer containing the major component of the cured resin as described above. Therefore, the heat resistance of the picture element assembly is improved. Accordingly, the response performance of the contact/separation with respect to the optical waveguide plate is improved. Further, the stability of the image display is enhanced.

The picture element assembly may include the layer containing the major component of the cured resin obtained by the polymerization with the principal ingredient which is composed of one or more materials selected from modified epoxy and bisphenol A type epoxy, and the curing agent which is composed of one or more materials selected from modified polyamine and modified alicyclic polyamine, or the layer containing the major component of the cured resin obtained by the polymerization with the principal ingredient which is composed of bisphenol F type epoxy or a mixture of bisphenol F type epoxy and glycidyl ether type epoxy, and the curing agent which is composed of modified polyamine or heterocyclic diamine modified product of tertiary amine.

In the display device constructed as described above, a part of the layer may be opposed to the optical waveguide plate. In this arrangement, the response performance of the contact/separation of the picture element assembly with respect to the optical waveguide plate is improved.

In the display device constructed as described above, when an adhesion suppressant is contained in the cured resin, it is possible to avoid such a phenomenon that the picture element assembly continues the adhesion to the optical waveguide plate. In this arrangement, it is preferable that when a precursor of the cured resin is defined as a resin precursor, the resin precursor and the adhesion suppressant are contained in the layer in a blending rate of 1:0.01 to 1:0.2 as represented by weight ratio.

It is preferable that the adhesion suppressant contains silicone grease and/or silicone oil. In this arrangement, it is preferable that the silicone grease and the silicone oil are contained in a blending rate of 1:0.1 to 0:1 as represented by weight ratio. The silicone grease may contain an inorganic filler.

As for the surface shape of the picture element assembly (especially the shape opposed to the optical waveguide plate), the leveling hardly occurs after the seepage to the interface, when the silicone grease, which is contained in the adhesion suppressant to be added to the resin precursor, has high thixotropy. The picture element assembly keeps the shape of the surface to which the silicone grease seeps to the surface. Therefore, the concave/convex structure or the irregular texture is apt to be formed. The surface shape is formed in such a way that the concave/convex structure is transferred to the surface of the picture element assembly. Accordingly, the response performance of the contact/separation of the picture element assembly with respect to the optical waveguide plate is improved.

As for the silicone oil, the leveling hardly occurs when the viscosity is high. An equivalent effect is obtained such that the more uniform concave/convex structure can be formed suitably over the entire interface between the picture element assembly and the optical waveguide plate. However, the silicone oil is apt to remain as a residual matter on the optical waveguide plate after the washing step to be performed thereafter. Therefore, the viscosity of the silicone oil to be added to the resin precursor may be selected considering the balance between the response performance of the contact/separation depending on the surface shape of the picture element assembly and the degree of occurrence of the white defect on the display due to the residual matter.

When the viscosity of the silicone oil to be added is lowered, the adhesion suppressant, which is subjected to the seepage, tends to undergo aggregation and leveling. As a result, deviation arises in the concave/convex structure of the surface shape of the picture element assembly, and/or the flat portion having no concave/convex structure is increased. Therefore, the response performance of the contact/separation may be lowered.

Therefore, it is preferable that dimethyl silicone oil having a viscosity of 5 mm$^2$/s to 3000 mm$^2$/s is used as the silicone oil described above. In this arrangement, the adhesion-suppressive effect is improved, it is easy to remove the adhesion suppressant adhered to the optical waveguide plate in the washing step, and it is possible to suppress the occurrence of the white defect on the display.

When an anti-foaming agent is contained in the cured resin, then the picture element assembly is prevented from contamination with bubbles, and it is possible to suppress the generation of any unnecessary scattered light.

According to another aspect of the present invention, there is provided a method for producing a display device comprising a substrate which has actuator elements, an optical waveguide plate, crosspieces which is interposed between the optical waveguide plate and the substrate and which surround the actuator elements, and picture element assemblies which are joined onto the actuator elements; the method comprising a step of preparing a picture element assembly precursor containing a mixture composed of one or more principal ingredients selected from modified epoxy, bisphenol A type epoxy, bisphenol F type epoxy, and glycidyl ether type epoxy, and one or more curing agents selected from modified polyamine, modified alicyclic polyamine, and heterocyclic diamine modified product of tertiary amine; a step of patterning the picture element assembly precursor; a step of joining the optical waveguide plate and the substrate; and a step of curing the picture element assembly precursor to form the picture element assembly.

In this process, the picture element assembly is manufactured by curing the picture element assembly precursor obtained by mixing the principal ingredient and the curing agent. Therefore, the heat resistance of the picture element assembly is improved. Accordingly, the response performance of the contact/separation with respect to the optical waveguide plate is improved. Further, the stability of the image display is enhanced.

The step of preparing the picture element assembly precursor may be performed to prepare the picture element assembly precursor containing the mixture composed of one or more principal ingredients selected from modified epoxy and bisphenol A type epoxy, and one or more curing agents selected from modified polyamine and modified alicyclic polyamine, or the picture element assembly precursor containing the mixture composed of the principal ingredient of bisphenol F type epoxy or a mixture of bisphenol F type epoxy and glycidyl ether type epoxy, and the curing agent of modified polyamine or heterocyclic diamine modified product of tertiary amine.

The production method described above may further comprise a step of preheating the picture element assembly precursor prior to the step of curing the picture element assembly precursor. The preheating step makes it possible to adjust the curing level of the picture element assembly precursor. The shape of the picture element assembly precursor can be controlled to be the shape with which the separation is easily made with respect to the optical waveguide plate, at the stage at which the optical waveguide plate and the substrate are joined to one another. Therefore, it is possible to improve the response performance of the contact/separation of the picture element assembly with respect to the optical waveguide plate.

In the production method described above, the step of curing the picture element assembly precursor may include a step of curing the picture element assembly precursor at room temperature, and a step of heating and curing the picture element assembly precursor at a temperature higher than the room temperature.

In this process, the step of curing the picture element assembly precursor at the room temperature and the step of heating and curing the picture element assembly precursor may be performed while displacing or driving the actuator elements by applying a voltage to the actuator elements.

In the present invention, the picture element assembly precursor may contain an adhesion suppressant, and the method may further comprise a step of allowing the adhesion suppressant to seep out. In this process, the step of allowing the adhesion suppressant to seep out may be performed by applying at least heat and/or vibration. When the method based on the heating is selected for the step of allowing the adhesion suppressant to seep out, the step of allowing the adhesion suppressant to seep out may also serve as the step of preheating the picture element assembly precursor described above.

The step of allowing the adhesion suppressant to seep out may be performed after the step of patterning the picture element assembly precursor, and/or after the step of joining the optical waveguide plate and the substrate, and/or during the step of curing the picture element assembly precursor. The phrase "during the step of curing the picture element assembly precursor" herein means "during the step of curing the picture element assembly precursor at the room temperature", "during the step of heating and curing the picture element assembly precursor", or "between the step of curing the picture element assembly precursor at the room temperature and the step of heating and curing the picture element assembly precursor".

The workpiece (in a state before being completed as the display device) may be introduced into the step of heating and curing the picture element assembly precursor without washing the adhesion suppressant which seeps out from the picture element assembly precursor.

The method for producing the display device may further comprise a step of washing the adhesion suppressant which seeps out from the picture element assembly. In this procedure, a pretreatment for the washing step is preferably performed such that the workpiece is immersed in a highly volatile liquid and the actuator elements are driven. Further, the washing step may be performed while displacing the actuator elements by applying a voltage to the actuator elements.

A procedure of the production method of the present invention will be explained below specifically. At first, the step of allowing the adhesion suppressant to seep out is performed at an arbitrary timing in an arbitrary number of times after the step of patterning the picture element assembly precursor, and/or after the step of joining the optical waveguide plate and the substrate, and/or during the step of curing the picture element assembly precursor.

As for a specified procedure for the seepage step, the heat or the vibration is applied (for example, the vibration is externally applied, or the vibration is applied by driving the actuator elements). Accordingly, the adhesion suppressant, which is dispersed in the picture element assembly precursor, tends to seep out by chance to facilitate the seepage.

The picture element assembly precursor is heated and cured at a temperature higher than the room temperature, for example, while allowing the adhesion suppressant to be interposed at the interface between the picture element assembly and the optical waveguide plate, after the step of curing the picture element assembly precursor at the room temperature. When the primary curing is completed in the curing step at the room temperature, it is possible to suppress the sudden softening and the leveling of the resin and the adhesion suppressant during the heating treatment to be performed thereafter.

The adhesion suppressant, which has seeped out to the interface between the picture element assembly precursor and the optical waveguide plate until the curing step at the room temperature, is allowed to remain as it is during the heating treatment, with which the adhesion suppressant, which seeps out by the heating treatment, is combined. Accordingly, it is possible to obtain, after the heating treatment as well, the concave/convex shape equivalent to the concave/convex shape of the surface of the picture element assembly precursor obtained upon the curing at the room temperature.

When the series of heating treatments are performed as described above, then the separation is facilitated for the resin and the adhesion suppressant as compared with a case in which only the curing step at the room temperature is performed, and the amount of the adhesion suppressant remaining in the resin is decreased. Therefore, when the actuator elements are driven thereafter, it is possible to decrease the amount of the adhesion suppressant which seeps out from the picture element assemblies by the contact/separation of the picture element assemblies with respect to the optical waveguide plate, and it is possible to suppress the fluctuation of the white defect level on the display.

Further, the following subsidiary effect is also obtained. It is possible to decrease the amount of addition of the adhesion suppressant itself to be added to the picture element assembly precursor, which is advantageous in view of the cost as well.

In the pretreatment for the washing step, the entire workpiece is immersed in the highly volatile liquid, and the actuator elements are driven in the immersion liquid. Accordingly, the adhesion suppressant having the high viscosity, which has seeped out to the interface between the optical waveguide plate and the picture element assemblies, is forcibly mixed with the highly volatile liquid having the low viscosity. When the highly volatile liquid is poured into the gap between the optical waveguide plate and the substrate to perform the washing thereafter, it is easy to remove the adhesion suppressant.

Further, when the step of once separating the picture element assemblies from the optical waveguide plate by previously applying a high voltage to the actuator elements is added before effecting the driving of the actuator elements in the immersion liquid, then it is possible to reliably perform the washing for the normal picture element assemblies, and it is possible to effectively suppress the occurrence of the white defect on the display.

Also in the washing step to be performed thereafter, the washing effect is also improved by performing the washing in the state in which the voltage is applied to the actuator elements to cause the displacement, i.e., in the state in which the gap is given between the picture element assemblies and the optical waveguide plate. Accordingly, it is possible to reliably remove the adhesion suppressant which would be otherwise hardly removed as a result of the heating. Thus, it is possible to suppress the occurrence of the white defect on the display.

After the washing step described above, the adhesion suppressant may be lost due to the washing treatment. If this state is maintained, the release performance may be deteriorated at the interface between the picture element assembly and the optical waveguide plate, resulting in the decrease in response characteristics of the contact/separation of the picture element assembly with respect to the optical waveguide plate, or resulting in the occurrence of the luminance deficiency.

In view of the above, when the adhesion suppressant is poured into the space between the picture element assemblies and the optical waveguide plate after the washing step, it is possible to recover the release performance at the interface between the picture element assemblies and the optical waveguide plate. It is possible to avoid the occurrence of the luminance deficiency and the decrease in the response characteristics of the contact/separation of the picture element assembly with respect to the optical waveguide plate as described above. It is preferable to use silicone oil as the adhesion suppressant in order to recover the release performance at the interface between the picture element assembly and the optical waveguide plate.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 7 shows a table illustrating the relationship concerning the offset potential (bias potential) applied to a row electrode, the electric potentials of an ON signal and an OFF signal applied to a column electrode, and the voltage applied between the row electrode and the column electrode;

FIG. 8 shows a table illustrating combinations of materials for cured resins for constructing transparent layers;

DESCRIPTION OF THE PREFERRED EMBODIMENTS

Illustrative embodiments of the display device and the method for producing the same according to the present invention will be explained below with reference to FIGS. 1 to 19B.

Figure 1:
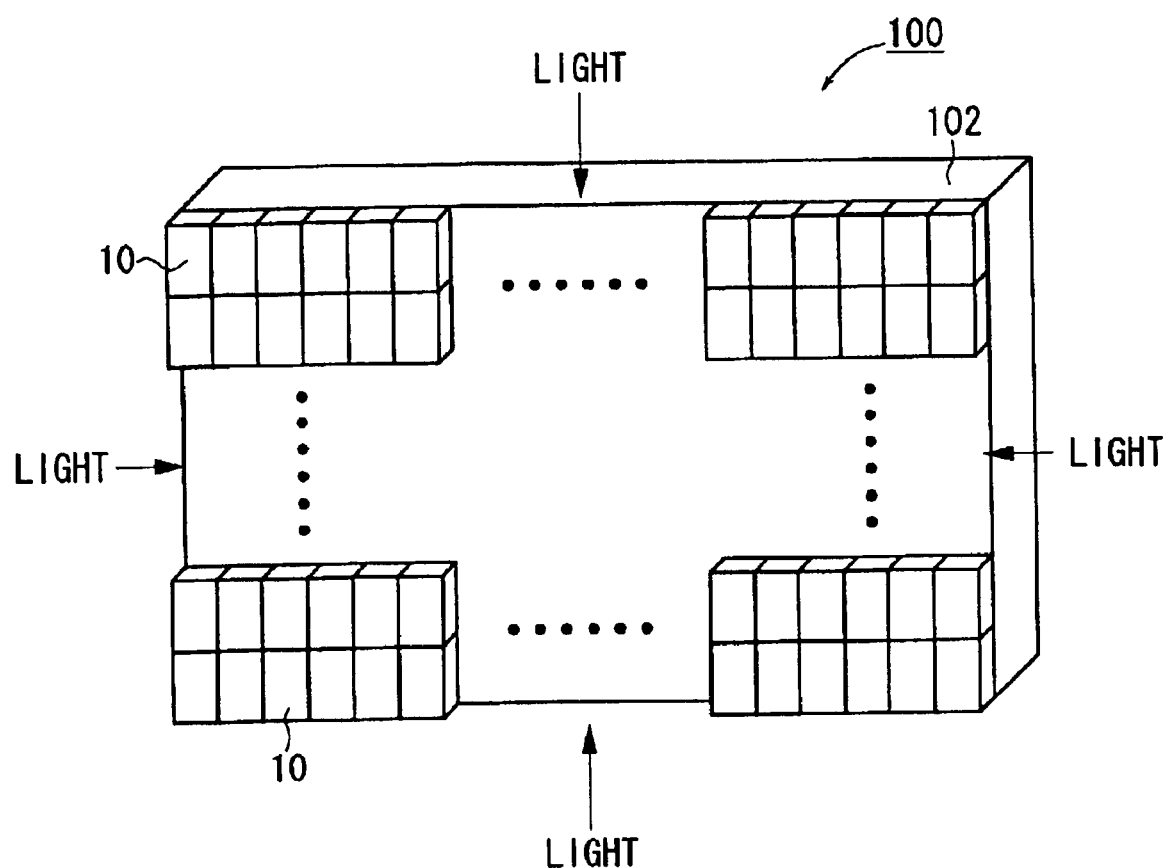
FIG. 1 schematically shows an entire arrangement of a large screen display constructed by arranging a plurality of display devices according to an embodiment of the present invention on an optical guide plate.

The display device 10 according to an embodiment of the present invention may be used, for example, as shown in FIG. 1. A large screen display 100 can be constructed by arranging a plurality of display devices 10 in the vertical direction and in the horizontal direction on a first principal surface of a large-sized optical guide plate 102 composed of, for example, glass or acrylic resin. For example, the large screen display 100 is of the direct vision type and of the thin type in which the luminance is high and the angle of view is wide.

Screens having a variety of shapes including, for example, those having the horizontal length longer than the vertical length, those having the vertical length longer than the horizontal length, and those having circular configurations, can be formed by arbitrarily changing the arrangement of the display devices 10, in addition to ordinary rectangular displays. When the optical guide plate is curved beforehand, a curved surface display can be also formed.

Figure 2:
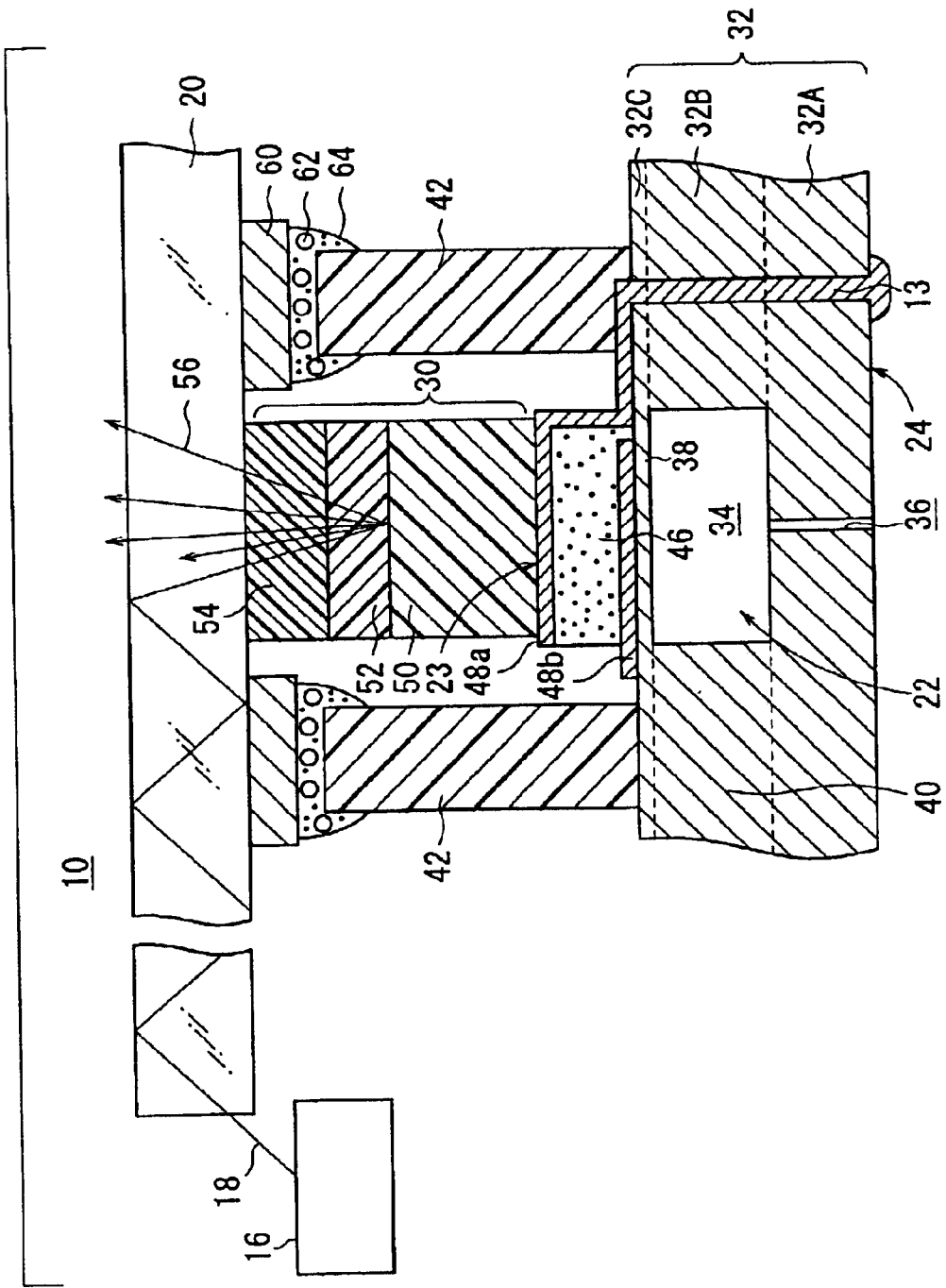
FIG. 2 shows, with partial omission, an arrangement of the display device according to the embodiment of the present invention.

As shown in FIG. 2, the display device 10 according to the embodiment of the present invention comprises an optical waveguide plate 20 into which light 18 from a light source 16 is introduced, and a driving section 24 which is provided opposingly to the back surface of the optical waveguide plate 20 and which includes a large number of actuator elements 22 arranged in a matrix form or in a zigzag form corresponding to picture elements (image pixels).

Figure 3:
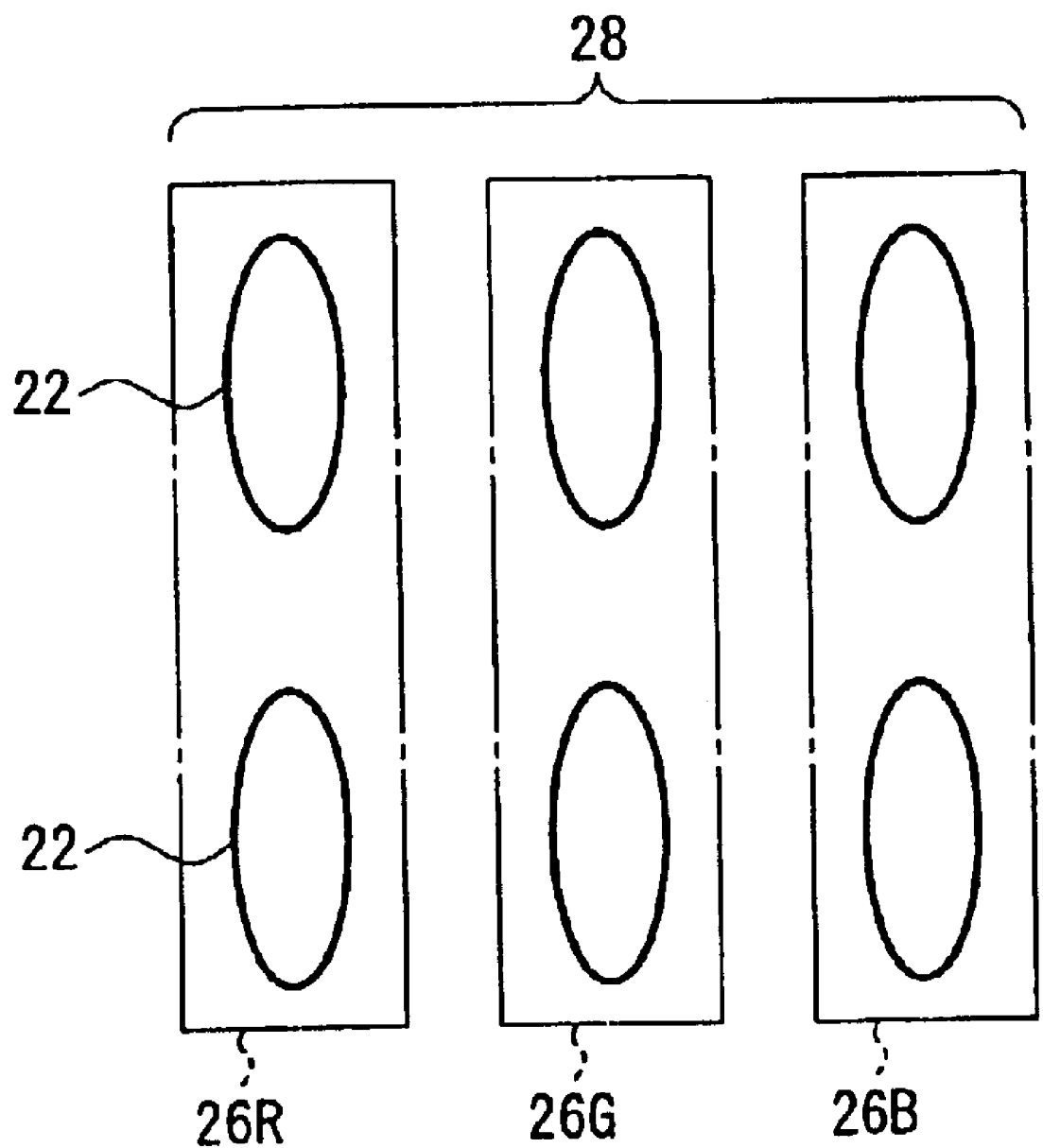
FIG. 3 schematically shows an arrangement of a picture element composed of red dots, green dots, and blue dots.

The arrangement of the picture element array is, for example, shown in FIG. 3. One dot 26 is constructed by two actuator elements 22 which are aligned in the vertical direction. One picture element 28 is constructed by three dots 26 (red dot 26R, green dot 26G, and blue dot 26B) which are aligned in the horizontal direction. In the display device 10, sixteen picture elements 28 (48 dots) are arranged in the horizontal direction, and sixteen picture elements 28 (16 dots) are arranged in the vertical direction.

As for the large screen display 100 shown in FIG. 1, in order to conform, for example, to the VGA standard, forty display devices 10 are arranged in the horizontal direction, and thirty display devices 10 are arranged in the vertical direction on the back surface of the optical guide plate 102 so that 640 picture elements (1920 dots) are aligned in the horizontal direction, and 480 picture elements (480 dots) are aligned in the vertical direction.

Materials which have a uniform large light transmittance in the visible light region, such as glass plates and acrylic plates are used for the optical guide plate 102. The respective display devices 10 are mutually connected to one another, for example, by means of wire bonding, soldering, end surface connector, or back surface connector so as to make it possible to supply signals between the display devices 10.

It is preferable that the refractive index of the optical guide plate 102 is similar to that of the optical waveguide plate 20 of each of the display devices 10. When the optical guide plate 102 and the optical waveguide plates 20 are bonded to one another, it is also preferable to use a transparent adhesive or a liquid. Preferably, the adhesive or the liquid is uniform and it has a high transmittance in the visible light region in the same manner as the optical guide plate 102 and the optical waveguide plate 20. It is also desirable that the refractive index of the adhesive or the liquid is similar to those of the optical guide plate 102 and the optical waveguide plate 20 in order to secure the brightness of the screen.

In each of the display devices 10, as shown in FIG. 2, a picture element assembly 30 is stacked on each of the actuator elements 22.

The driving section 24 includes an actuator substrate 32 composed of, for example, ceramics. Two actuator elements 22 are arranged at portions at which the respective dots 26 of the actuator substrate 32 are to be formed respectively. The actuator substrate 32 has its first principal surface which is arranged to oppose to the back surface of the optical waveguide plate 20. The first principal surface is a continuous surface (flushed surface). Hollow spaces 34 which are formed for respective vibrating sections as described later are provided in the actuator substrate 32 at positions corresponding to the portions at which the respective actuator elements 22 are to be formed. The respective hollow spaces 34 communicate with the outside by the through-holes 36 which have a small diameter and which are provided at the second end surface of the actuator substrate 32.

The portion of the actuator substrate 32, at which the hollow space 34 is formed, is thin-walled. The other portion of the actuator substrate 32 is thick-walled. The thin-walled portion has a structure which tends to undergo vibration in response to external stress, and it functions as a vibrating section 38. The portion other than the hollow space 34 is thick-walled, and it functions as a fixed section 40 for supporting the vibrating section 38.

The actuator substrate 32 has a stacked structure comprising a substrate layer 32A as a lowermost layer, a spacer layer 32B as an intermediate layer, and a thin plate layer 32C as an uppermost layer. The actuator substrate 32 can be recognized as an integrated structure including the hollow spaces 34 formed at the positions in the spacer layer 32B corresponding to the actuator elements 22. The substrate layer 32A functions as a substrate for reinforcement, as well as it functions as a substrate for circuit patterns. The actuator substrate 32 may be fired in an integrated manner, or it may be additionally attached.

The thickness of the thin plate layer 32C is usually not more than 50 μm and preferably about 3 to 20 μm in order to greatly displace the actuator element 22.

Figure 4:
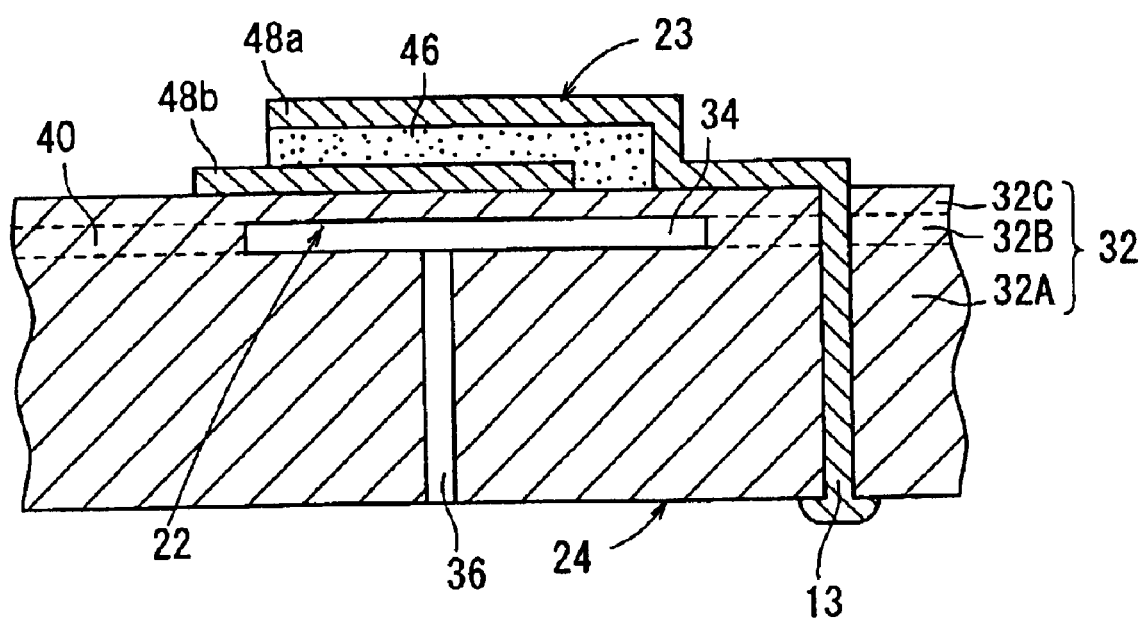
FIG. 4 illustrates an exemplary arrangement adopted when a spacer layer is thinned.

The spacer layer 32B constitutes the hollow space 34 in the actuator substrate 32, the thickness of the space layer 32B is not specifically limited. However, the thickness may be determined depending on the function the hollow space 34. Especially, it is preferable that the thickness possessed by the spacer layer 32B is not more than a thickness which is necessary for the actuator element 22 to function. For example, as shown in FIG. 4, it is preferable that the spacer layer 32B is thin. It is preferable that the thickness of the spacer layer 32B is equivalent to the magnitude of the displacement of the actuator element 22 to be used.

Owing to the arrangement as described above, the flexion of the thin-walled portion (portion of the vibrating section 38) is restricted by the substrate layer 32A which is disposed closely in the flexion direction to prevent the thin-walled portion from destruction which would be otherwise caused by unintentional application of any external force. It is also possible to stabilize the displacement of the actuator element 22 to have a specified value by utilizing the effect to restrict the flexion brought about by the substrate layer 32A.

When the spacer layer 32B is made thin, then the thickness of the actuator substrate 32 itself is decreased, and it is possible to decrease the flexural rigidity. Accordingly, for example, when the actuator substrate 32 is bonded and fixed to another member, then the warpage or the like of the subject (in this case, the actuator substrate 32) is effectively reformed with respect to the object (for example, the optical waveguide plate 20), and it is possible to improve the reliability of the bonding and the fixation.

Additionally, the actuator substrate 32 is constructed to be thin as a whole, and hence it is possible to reduce the amount of use of raw materials when the actuator substrate 32 is produced. This structure is also advantageous in view of the production cost. Therefore, in particular, it is preferable that the thickness of the spacer layer 32B is 3 to 50 μm. Especially, it is preferable that the thickness of the spacer layer 32B is 3 to 20 μm.

The thickness of the substrate layer 32A is generally not less than 50 μm and preferably about 80 to 300 μm in order to reinforce the entire actuator substrate 32, because the spacer layer 32B is constructed to be thin as described above.

Specified embodiments of the actuator element 22 and the picture element assembly 30 will now be explained. At first, each of the actuator elements 22 comprises the vibrating section 38 and the fixed section 40, as well as a main actuator element 23 which is composed of a shape-retaining layer 46 such as a piezoelectric/electrostrictive layer or an anti-ferroelectric layer directly formed on the vibrating section 38, and a pair of electrodes 48 (a row electrode 48a and a column electrode 48b) formed on an upper surface and a lower surface of the shape-retaining layer 46.

The picture element assembly 30 can be constructed by a stack comprising a white scattering element 50 formed on the main actuator element 23, a color layer 52 formed on the white scattering element 50, and a transparent layer 54 formed on the color layer 52. The stack also functions as a displacement-transmitting section of the actuator element 22. For example, a color filter or a color scattering element can be used for the color layer 52.

Further, although not shown, a light-reflective layer may be provided as a lower layer of the color layer 52. In this arrangement, it is desirable that an insulating layer is formed between the light-reflective layer and the main actuator element 23.

The display device 10 according to the embodiment of the present invention comprises crosspieces 42 which are formed at portions other than the picture element assemblies 30 between the optical waveguide plate 20 and the actuator substrate 32. A light-shielding layers 60 is allowed to interposed between the crosspiece 42 and the optical waveguide plate 20. The light-shielding layer 60 is joined to the crosspiece 42 by the aid of a filler-containing adhesive 64 which contains a filler 62.

Figure 5:
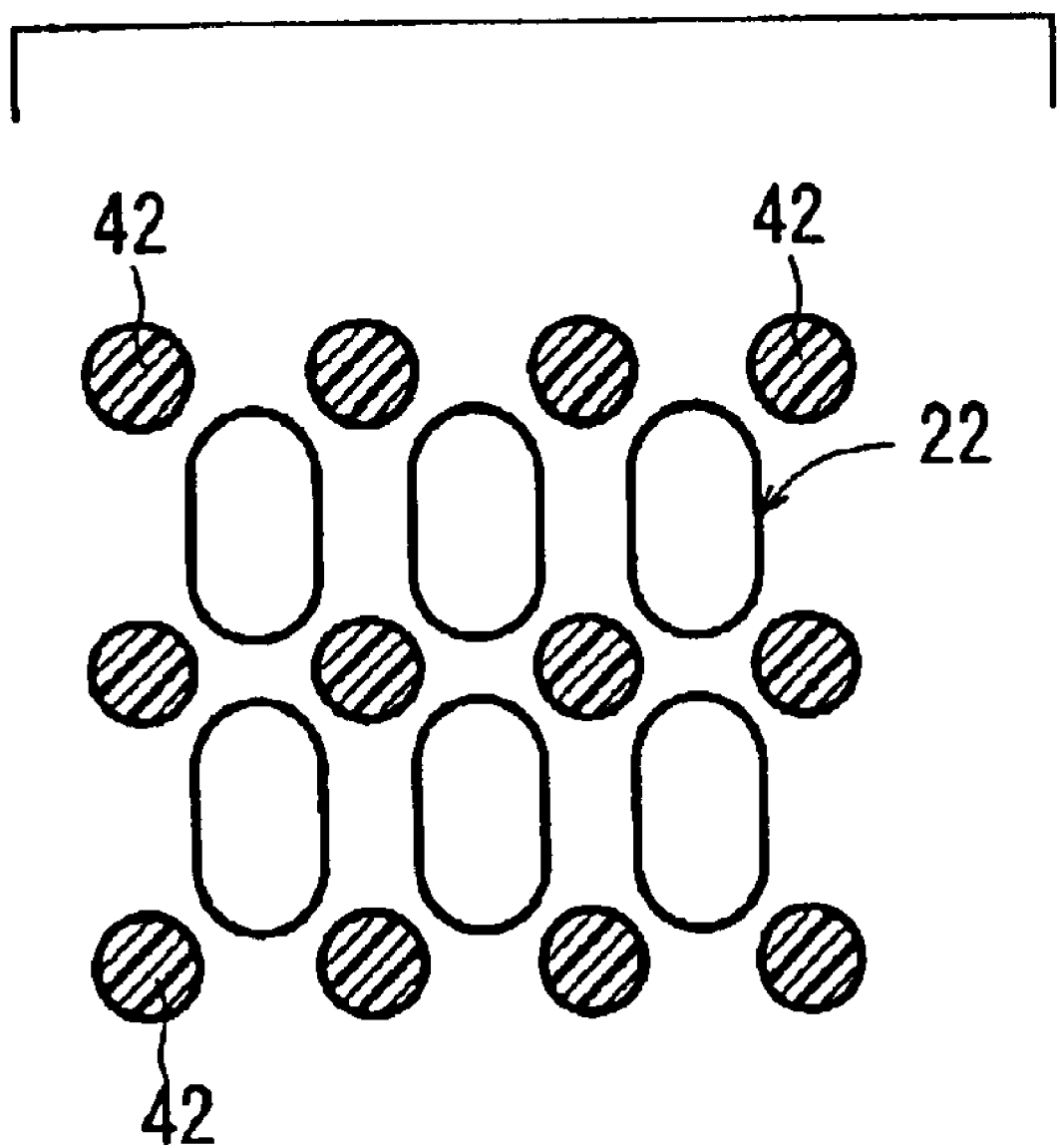
FIG. 5 is a plan view illustrating an exemplary arrangement of crosspieces.
Figure 6:
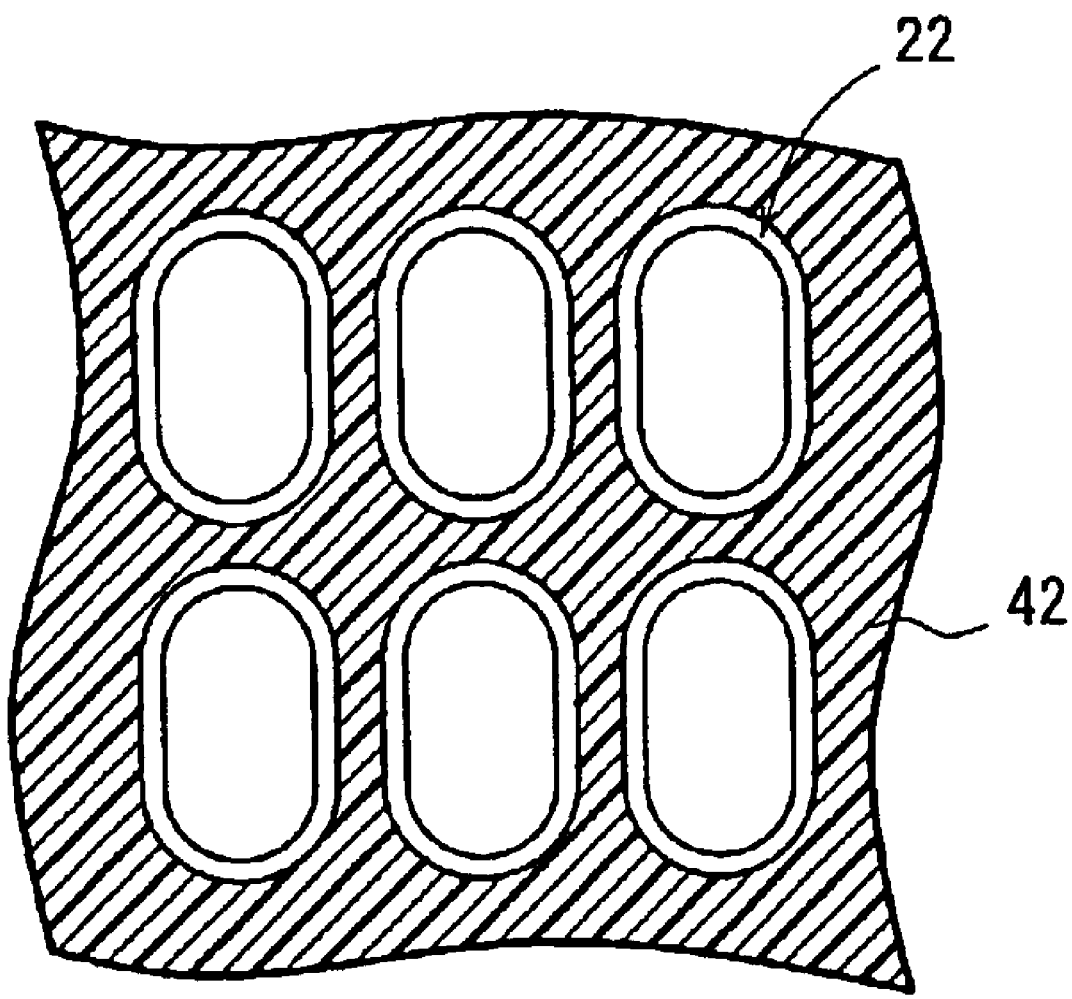
FIG. 6 is a plan view illustrating another exemplary arrangement of crosspieces.

For example, as shown in FIG. 5, the crosspieces 42 are formed at the portions outside the four corners of the actuator elements 22. Accordingly, the crosspieces 42 surround the actuator elements 22. Alternatively, as shown in FIG. 6, the crosspiece 42 may be formed to cover all portions other than the actuator elements 22 on the actuator substrate 32.

It is more preferable that the crosspiece 42 is composed of a cured resin containing an unillustrated filler. The cured resin is exemplified, for example, by thermosetting resin such as epoxy resin, photocurable resin, moisture-curable resin, and cold setting resin.

As for the crosspiece 42 containing the filler, the hardness is high, and the heat resistance, the strength, and the dimensional stability are high, as compared with crosspieces containing no filler. In the case of the crosspiece 42 containing the filler, the amount of transformation, which is caused by the increase in internal temperature of the display device 10, is remarkably small, as compared with crosspieces containing no filler. In other words, when the filler is contained, then it is possible to improve the hardness, the heat resistance, and the strength of the cured resin, and it is possible to remarkably decrease the amounts of expansion and contraction caused by the heat.

Therefore, even when the internal temperature of the display device 10 is raised, then the spacing distance between the optical waveguide plate 20 and the actuator substrate 32 is retained to be constant, and the contact and/or the separation between the optical waveguide plate 20 and the picture element assembly 30 is performed reliably. Therefore, it is possible to reliably allow the unit dot 26 to effect light emission and light off.

Preferred examples of the filler include high strength substances such as ceramics, plastic, and glass. Such a high strength substance improves the strength of the crosspiece 42.

It is preferable that the ratio of the filler in the resin as a raw material for the crosspiece 42 is 0.1 to 80% by weight. If the ratio is less than 0.1% by weight, the effect is inferior to improve the hardness, the heat resistance, and the strength. If the ratio exceeds 80% by weight, the adhesive ability is inferior, because the ratio of the resin is low. More preferably, the ratio of the filler is 5 to 50% by weight.

It is preferable that the size of the filler is 0.1 to 50 μm depending on the dimension of the crosspiece 42. If the size of the filler is less than 0.1 μm, the effect is inferior to improve the hardness, the heat resistance, and the strength. If the size of the filler exceeds 50 μm, the strength of the crosspiece 42 is lowered in some cases.

Next, the operation of the display device 10 according to the embodiment of the present invention will be briefly explained with reference to FIG. 2. As shown in FIG. 7, the description of the operation is illustrative of a case in which the offset potential, which is used and applied to the row electrode 48a of each of the actuator elements 22, is, for example, 10 V, and the electric potentials of the ON signal and the OFF signal, which are used and applied to the column electrode 48b of each of the actuator elements 22, are 0 V and 60 V respectively.

Therefore, the low level voltage (−10 V) is applied between the column electrode 48b and the row electrode 48a in the actuator element 22 in which the ON signal is applied to the column electrode 48b. The high level voltage (50 V) is applied between the column electrode 48b and the row electrode 48a in the actuator element 22 in which the OFF signal is applied to the column electrode 48b.

At first, the light 18 is introduced, for example, from the end portion of the optical waveguide plate 20. In this embodiment, all of the light 18 is totally reflected at the inside of the optical waveguide plate 20 without being transmitted through the front and back surfaces thereof by controlling the magnitude of the refractive index of the optical waveguide plate 20, in the state in which the picture element assembly 30 does not make contact with the optical waveguide plate 20. The reflection factor n of the optical waveguide plate 20 is desirably 1.3 to 1.8, and more desirably 1.4 to 1.7.

In this embodiment, in the natural state of the actuator element 22, the end surface of the picture element assembly 30 contacts with the back surface of the optical waveguide plate 20 at the distance of not more than the wavelength of the light 18. Therefore, the light 18 is reflected by the surfaces of the color layer 52 and the white scattering element 50 of the picture element assembly 30, and it behaves as scattered light 56. A part of the scattered light 56 is reflected again in the optical waveguide plate 20. However, almost all of the scattered light 56 is not reflected by the optical waveguide plate 20, and it is transmitted through the front surface (face) of the optical waveguide plate 20. Accordingly, all of the actuator elements 22 are in the ON state to emit light. Further, the color of the light emission corresponds to the color of the color layer 52 included in the picture element assembly 30. Since the ON signal is applied to the actuator element 22, the picture element assembly 30 is pressed by the optical waveguide plate 20, whereby the picture element emitting light more reliably.

Starting from this state, when the OFF signal is applied to the actuator element 22 corresponding to a certain dot 26, the actuator element 22 makes the bending displacement to be convex toward the hollow space 34, i.e., it makes the bending displacement in the first direction. The end surface of the picture element assembly 30 is separated from the optical waveguide plate 20, and the actuator element 22 is in the OFF state to stop light emission.

In the display device 10, the presence or absence of light emission (leakage light) at the front surface of the optical waveguide plate 20 can be controlled depending on the presence or absence of the contact of the picture element assembly 30 with the optical waveguide plate 20.

Especially, in the display device 10, one unit for making the displacement action of the picture element assembly 30 in the direction to make approach or separation with respect to the optical waveguide plate 20 is arranged in the vertical direction to be used as one dot. The array of the three dots in the horizontal direction (red dot 26R, green dot 26G, and blue dot 26B) is used as one picture element. A large number of the picture elements are arranged in a matrix configuration or in a zigzag configuration concerning the respective rows. Therefore, it is possible to display a color screen image (characters and graphics) corresponding to the image signal on the front surface of the optical waveguide plate 20, i.e., on the display surface, in the same manner as in the cathode ray tube, the liquid crystal display device, and the plasma display, by controlling the displacement action in each of the picture elements in accordance with the attribute of the inputted image signal.

The display device 10 according to this embodiment includes the transparent layer 54, the color layer 52, and the white scattering element 50 for constructing the picture element assembly 30. Among them, the transparent layer 54, which is the layer to make the contact/separation with respect to the optical waveguide plate 20, is composed of a resin having high heat resistance.

The transparent layer 54 contains a major component of a cured resin obtained by polymerization with a principal ingredient which is composed of one or more materials selected from modified epoxy, bisphenol A type epoxy, bisphenol F type epoxy, and glycidyl ether type epoxy, and a curing agent which is composed of one or more materials selected from modified polyamine, modified alicyclic polyamine, and heterocyclic diamine modified product of tertiary amine, and the transparent layer 54 further contains an adhesion suppressant.

Specifically, it is possible to select any one of eight types of combinations shown in FIG. 8.

With reference to FIG. 8, Type A is based on the use of modified epoxy (R2007) for the principal ingredient and the use of modified polyamine (3600B) for the curing agent. Type B is based on the use of modified epoxy (R2007) and modified epoxy (3600A) for the principal ingredient and the use of modified alicyclic polyamine (H1004) and modified polyamine (3600B) for the curing agent.

Type C is based on the use of bisphenol A type epoxy resin (CS2340-5) for the principal ingredient and the use of modified polyamine (3600B) for the curing agent. Type D is based on the use of the bisphenol A type epoxy resin (CS2340-5) and modified epoxy (R2007) for the principal ingredient and the use of modified polyamine (3600B) for the curing agent.

Type E is based on the use of a mixture of bisphenol F type epoxy and glycidyl ether type epoxy for the principal ingredient and the use of modified polyamine (3600B) for the curing agent. Type F is based on the use of a mixture of bisphenol F type epoxy and glycidyl ether type epoxy for the principal ingredient and the used of heterocyclic diamine modified product of tertiary amine for the curing agent.

Type G is based on the use of bisphenol F type epoxy for the principal ingredient and the use of modified polyamine (3600B) for the curing agent. Type H is based on the use of bisphenol F type epoxy for the principal ingredient and heterocyclic diamine modified product of tertiary amine for the curing agent.

Any one of modified epoxy (R2007), modified epoxy (3600A), modified polyamine (3600B), and modified alicyclic polyamine (H1004) is a material produced by Alpha Techno Company (ALTECO). Bisphenol A type epoxy resin (CS2340-5) is a material produced by CEMEDINE CO., LTD.

In the embodiment of the present invention, a mixture of silicone grease and dimethyl silicone oil was used for the adhesion suppressant to be added to a precursor 54a of the transparent layer 54. Especially, it is preferable that one having a viscosity of 5 mm$^2$/s to 3000 mm$^2$/s is used for dimethyl silicone oil. It is preferable that one having high thixotropy is used for silicone grease. In this case, it is preferable that the blending ratio for the silicone grease and dimethyl silicone oil is 1.0:0.1 to 0:1.0 in weight ratio. Preferably, an inorganic filler is contained for silicone grease since the concave/convex shape based on the seeped adhesion suppressant tends to be retained, and the surface shape of the picture element assembly 30 can be controlled to be the concave/convex shape described above.

When the precursor of the cured resin of the transparent layer 54 is defined as "resin precursor", it is preferable that the resin precursor and the adhesion suppressant are contained in a blending rate of 1:0.01 to 1:0.2 as represented by weight ratio. Further, when an anti-foaming agent is contained in the cured resin, then the picture element assembly 30 is prevented from any contamination with bubbles, and it is possible to suppress the generation of any unnecessary scattered light.

Next, explanation will be made for an exemplary method for producing the display device 10 according to an embodiment of the present invention with reference to the process progress shown in FIGS. 9 to 13 and the block diagrams illustrating steps shown in FIGS. 14 to 16.

Figure 9:
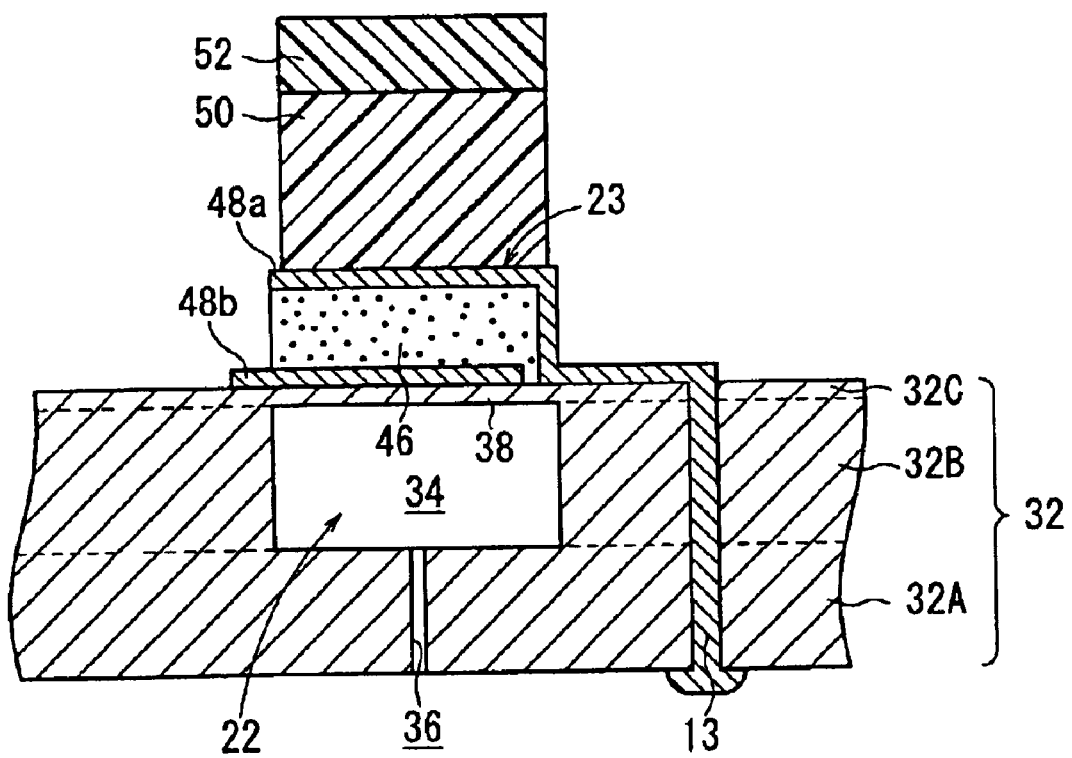
FIG. 9 shows the process progress illustrating a state in which a white scattering element and a color layer are formed on an actuator element.

At first, as shown in FIG. 9, the actuator element 22 is formed on the actuator substrate 32. In this embodiment, the actuator substrate 32 can be obtained as follows. A flat plate-shaped substrate layer 32A, which is formed with the through-hole 36 penetrating from the first principal surface to the second principal surface, is prepared. A spacer layer 32B, which has, for example, a window at a portion corresponding to the through-hole 36, is placed on the flat plate-shaped substrate layer 32A. Further, a thin plate layer 32C is placed on the spacer layer 32B, followed by being fired into one unit. In this procedure, the window of the spacer layer 32B serves as the hollow space 34, and the vibrating section 38 based on the thin-walled portion is consequently formed on the hollow space 34.

The through-hole 13 shown in FIG. 9 is formed by mutually piling up through-holes previously provided respectively for the substrate layer 32A, the spacer layer 32B, and the thin plate layer 32C described above. Alternatively, the through-hole 13 may be provided and formed for the actuator substrate 32 after placing the respective layers or after performing the firing treatment.

Those preferably adopted for the constitutive materials for the substrate layer 32A, the spacer layer 32B, and the thin plate layer 32C include those provided with all of the high heat resistance, the high strength, and the high toughness, such as fully stabilized zirconium oxide, partially stabilized zirconium oxide, aluminum oxide, magnesium oxide, titanium oxide, spinel, and mullite. An identical material may be used for all of the substrate layer 32A, the spacer layer 32B, and the thin plate layer 32C. Alternatively, different materials may be used for the substrate layer 32A, the spacer layer 32B, and the thin plate layer 32C respectively.

The column electrode 48b is formed on the vibrating section 38 of the actuator substrate 32 by means of the film formation method such as the photolithography method, the screen printing method, the dipping method, the application method, the electrophoresis method, the ion beam method, the sputtering method, the vacuum evaporation method, the ion plating method, the chemical vapor deposition (CVD) method, and the plating; the column electrode 48b being composed of a conductive material including, for example, respective metals such as aluminum, titanium, chromium, iron, cobalt, nickel, copper, zinc, niobium, molybdenum, ruthenium, palladium, rhodium, silver, stannum, tantalum, tungsten, iridium, platinum, gold, and lead; alloys containing constitutive components of two or more of them; those obtained by adding metal oxide such as aluminum oxide, titanium oxide, zirconium oxide, cerium oxide, and copper oxide to the metal or the alloy as described above; and those prepared as cermet obtained by dispersing the same material as the constitutive material for the actuator substrate 32 described above and/or the same material as the piezoelectric/electrostrictive material described later on in the metal or the alloy. Especially, it is preferable that the cermet is used for the electrode, since it is possible to effectively suppress the time-dependent deterioration of the displacement action when the shape-retaining layer 46 is operated.

Subsequently, the shape-retaining layer 46 is formed on the column electrode 48b. A material, which causes the polarization or the phase transition by the electric field, is selected as the constitutive material for the shape-retaining layer 46. The shape-retaining layer 46 is composed of a piezoelectric/electrostrictive material or an anti-ferroelectric material.

Preferred examples of the piezoelectric/electrostrictive material include lead zirconate, lead manganese tungstate, bismuth sodium titanate, potassium sodium niobate, bismuth strontium tantalate, lead magnesium niobate, lead nickel niobate, lead zinc niobate, lead manganese niobate, lead magnesium tantalate, lead nickel tantalate, lead antimony stannate, lead titanate, barium titanate, lead magnesium tungstate, lead cobalt niobate, and composite oxides composed of two or more of the compounds described above. Each of the piezoelectric/electrostrictive materials may form a solid solution, for example, with oxide of, for example, lanthanum, calcium, strontium, molybdenum, tungsten, barium, niobium, zinc, nickel, manganese, cerium, cadmium, chromium, cobalt, antimony, iron, yttrium, tantalum, lithium, bismuth, and stannum.

Preferred examples of the anti-ferroelectric material include, for example, lead zirconate, composite oxide of lead zirconate and lead stannate, and composite oxide of lead zirconate, lead stannate, and lead niobate. Each of the anti-ferroelectric materials may also form a solid solution with the respective elements as described above.

Subsequently, the row electrode 48a, which is composed of a conductive material as described above, is formed in a region ranging over the side surface and the upper surface of the shape-retaining layer 46 via the through-hole 13 provided for the actuator substrate 32 from the lower surface of the actuator substrate 32.

The actuator element 22 is constructed by the vibrating section 38 of the actuator substrate 32 and the column electrode 48b, the shape-retaining layer 46, and the row electrode 48a formed as described above.

In Step SA61 (see FIG. 14), respective precursors of the white scattering element 50 and the color layer 52 are formed on the actuator element 22 of the actuator substrate 32. Alternatively, although not shown, a light-reflective layer composed of metal may be formed before forming the precursor of the white scattering element 50. In this procedure, it is desirable that an insulating layer is further formed before forming the light-reflective layer.

The precursor of the white scattering element 50 can be formed by using a thermosetting resin such as epoxy resin dispersed with titanium oxide or the like beforehand. The precursor of the color layer 52 can be formed by using a thermosetting resin such as epoxy resin dispersed with fluorescent pigment beforehand.

Subsequently, in Step SA62 (see FIG. 14), as shown in FIG. 9, the respective precursors of the white scattering element 50 and the color layer 52 are cured by means of the heating treatment to form the white scattering element 50 and the color layer 52.

Figure 10:
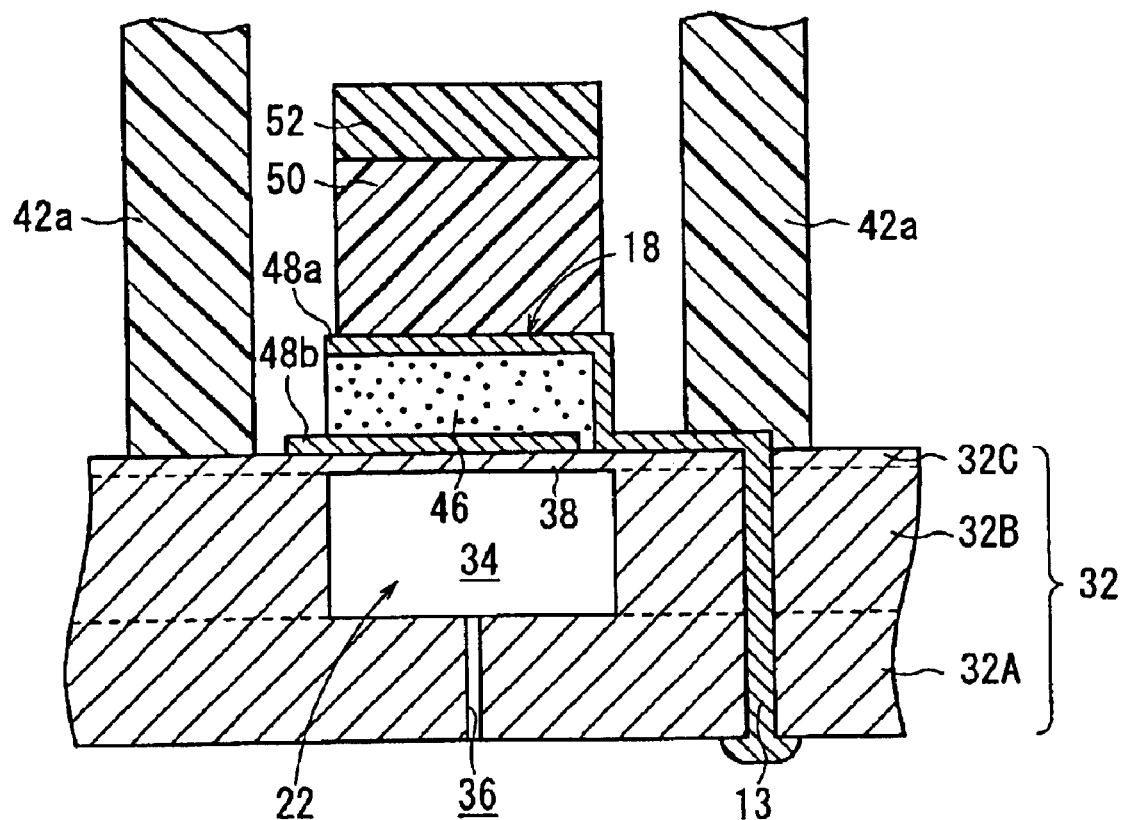
FIG. 10 shows the process progress illustrating a state in which crosspiece precursors are formed on an actuator substrate.

Subsequently, in Step SA63 (see FIG. 14), as shown in FIG. 10, elongated thick films, each of which is composed of, for example, a thermosetting resin such as epoxy resin containing filler, are formed outside the four corners of the actuator element 22. The thick film is the crosspiece precursor 42a. As shown in FIG. 6, the crosspiece precursor 42a may be formed to cover all portions except for the actuator elements 22 on the actuator substrate 32.

Figure 11:
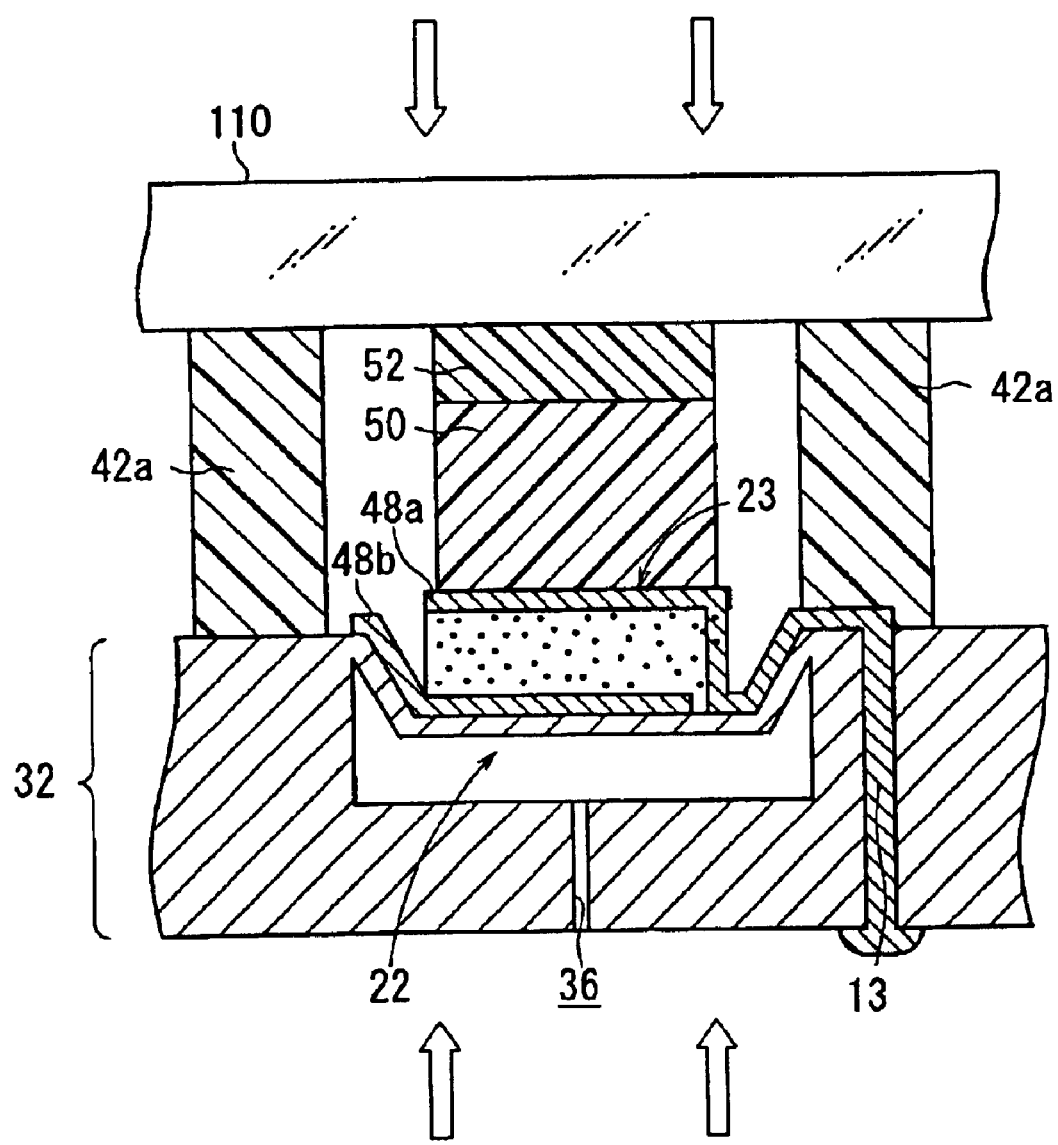
FIG. 11 shows the process progress illustrating a state in which the height of the crosspiece precursors is limited by a plate member for the figuring.

After that, in Step SA64 (see FIG. 14), as shown in FIG. 11, a plate member 110 for the figuring is placed on the upper surface of the crosspiece precursor 42a. Further, the plate member 110 is pressed toward the actuator substrate 32. The pressing method is not specifically limited. However, it is possible to preferably adopt, for example, the pressing with a weight, the CIP (cold isostatic press) method, the pressing with flip chip bonder, the constant value control, the low pressure pressing method, and the vacuum packaging method. Further, at the pressing stage, a voltage may be applied between the column electrode 48b and the row electrode 48a to displace the actuator element 22 in a direction toward the actuator substrate 32. As a result of the figuring step, the height of the crosspiece precursor 42a is determined by the aid of the portions up to the color layer 52 to serve as the spacer.

Figure 12:
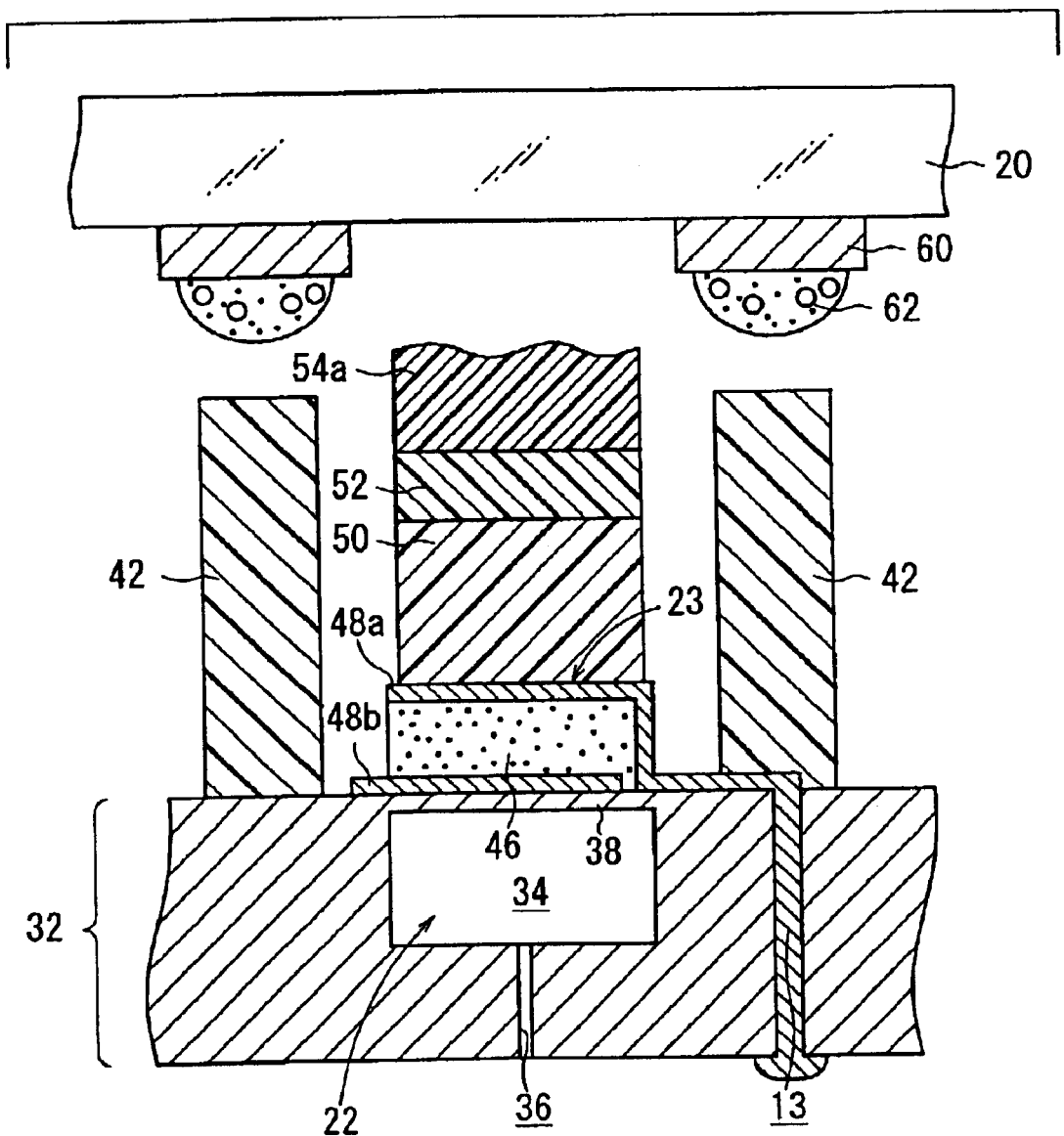
FIG. 12 shows the process progress illustrating a state in which a transparent layer precursor (added with an adhesion suppressant) is formed on the color layer, and a light-shielding layer and a filler-containing adhesive are formed on the surface of an optical waveguide plate.

Subsequently, in Step SA65 (see FIG. 14), as shown in FIG. 12, the crosspiece precursor 42a is cured by performing the heating treatment to form the crosspieces 42. In this process, it is desirable that the crosspiece precursor 42a is cured up to a state in which the crosspiece precursor 42a is not contracted any longer. Accordingly, the amount of transformation of the crosspiece 42, which is caused by the increase in internal temperature of the display device 10, is remarkably decreased. Thus, the time-dependent change of the contact/separation of the display device 10 is remarkably suppressed.

Subsequently, in Step SA66 (see FIG. 14), as shown in FIG. 12, a precursor 54a of the transparent layer 54 (hereinafter referred to as "transparent layer precursor 54a"), to which the adhesion suppressant is previously added, is formed on the color layer 52.

A technique for adding the adhesion suppressant to the transparent layer precursor 54a will now be explained with reference to FIG. 16.

Figure 16:
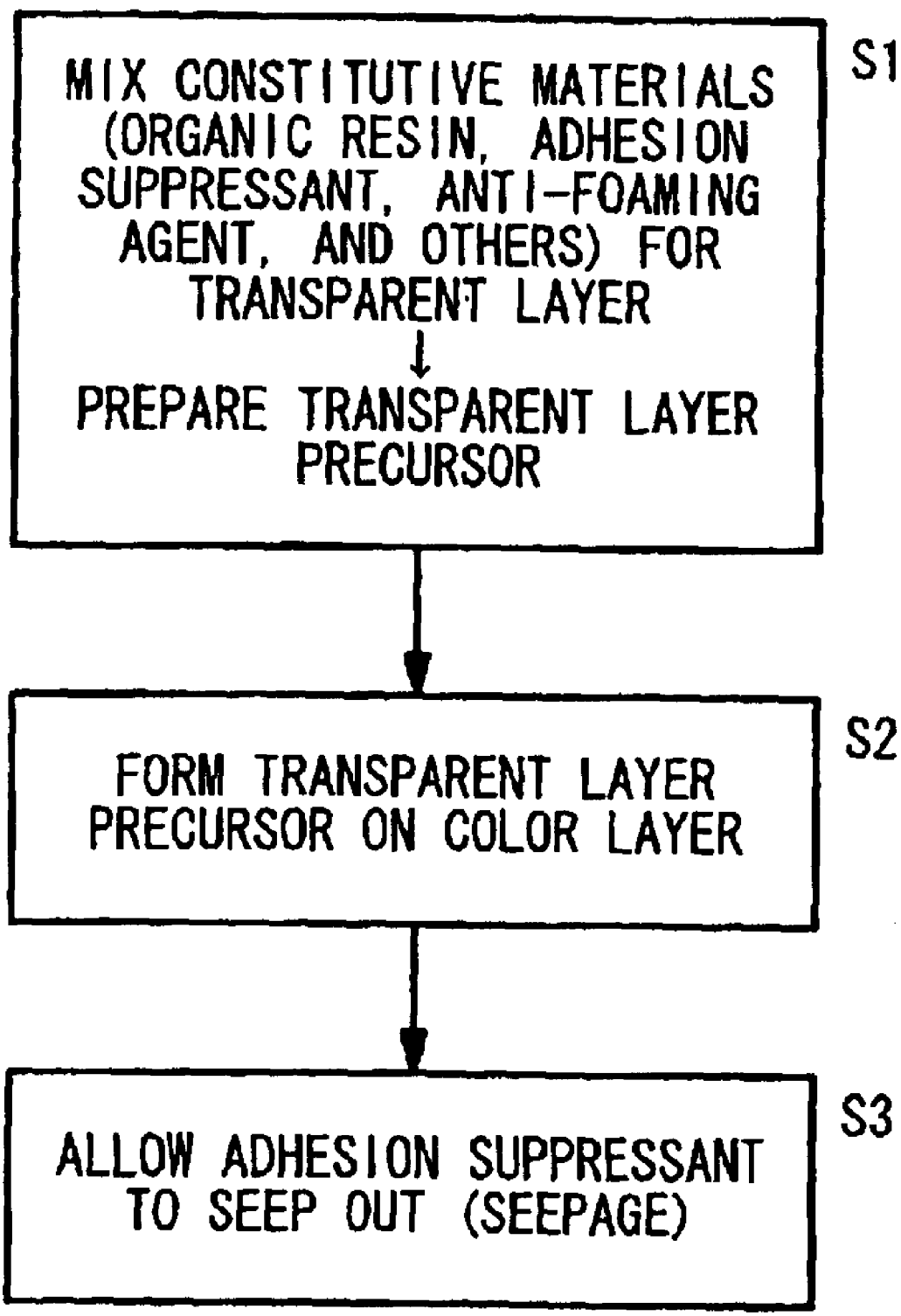
FIG. 16 shows a block diagram illustrating steps of the technique for adding the adhesion suppressant to the transparent layer precursor.

At first, in Step S1 shown in FIG. 16, the adhesion suppressant and other additives are contained in an organic resin to prepare a paste of the transparent layer precursor 54a, the organic resin being prepared by mixing one or more principal ingredients selected from modified epoxy, bisphenol A type epoxy, bisphenol F type epoxy, and glycidyl ether type epoxy, and one or more curing agents selected from modified polyamine, modified alicyclic polyamine, and heterocyclic diamine modified product of tertiary amine.

A material, which is not easily mixed with the organic resin as the constitutive material for the transparent layer 54 in a single substance, is selected for the adhesion suppressant. The paste, in which the adhesion suppressant is uniformly dispersed in the transparent layer precursor 54a, is prepared by performing agitation and mixing, for example, with a grinding mixer.

Any one of those of the eight types, i.e., Type A to Type H shown in FIG. 8 is selected for the organic resin as the constitutive material for the transparent layer 54. For example, silicone oil, silicone grease or the like as described above is preferably adopted for the adhesion suppressant.

Subsequently, in Step S2, the transparent layer precursor 54a is formed on the color layer 52, for example, by means of the screen printing method (see FIG. 12).

After that, in the seepage step for the adhesion suppressant as described later on, the adhesion suppressant is allowed to seep out (leak) from the surface of the transparent layer precursor 54a.

As for the optical waveguide plate 20, the light-shielding layer 60 is formed on the surface of the optical waveguide plate 20 in accordance with the film formation method as described above in Step SB61 (see FIG. 14) as shown in FIG. 12.

As described above, the light-shielding layer 60 is composed of, for example, a metal having low light-absorbing ability such as Cr, Al, Ni, and Ag, a resin containing carbon black, black pigment, and/or black dye, or a transparent cured resin having low light-scattering property. The light-shielding layer 60 is formed at the position which is placed on the crosspiece 42.

Unnecessary organic matters remain in some cases on the surface of the optical waveguide plate 20 after the formation of the light-shielding layer 60. For example, when the light-shielding layer 60 is formed by means of the photolithography method, any photoresist remains on the surface of the optical waveguide plate 20 in some cases. If the optical waveguide plate 20, in which the unnecessary organic matters remain on the surface as described above, is placed on the transparent layer precursor 54a, the transparent layer precursor 54a adheres to the optical waveguide plate 20 with ease. In this situation, even when the actuator element 22 is displaced downwardly, the transparent layer 54 is not separated from the optical waveguide plate 20 by a predetermined spacing distance. As a result, it is impossible to allow the unit dot 26 having the transparent layer 54 to be in the complete light-off state.

Even when the light-shielding layer 60 is not formed on the optical waveguide plate 20, organic matters adhere to the optical waveguide plate in some cases as described above, as a result of any contact of the optical waveguide plate 20, for example, with equipment or apparatus to which organic matters such as human sweat or skin oil adhere. Also in such a situation, it is sometimes impossible to allow the unit dot 26 to be in the complete light-off state in the same manner as described above.

Therefore, it is desirable that the unnecessary organic matters are previously removed in Step SB62 (see FIG. 14) before joining the optical waveguide plate 20 to the crosspieces 42. Specifically, the optical waveguide plate 20 is subjected to a washing treatment. Alternatively, an ashing treatment may be performed for the unnecessary organic matters remaining on the surface of the optical waveguide plate 20.

The washing treatment for the optical waveguide plate 20 is performed, for example, by immersing the optical waveguide plate 20 in an acidic solution. Alternatively, the optical waveguide plate 20 may be immersed in ultra-pure water to perform the ultrasonic washing. Further alternatively, the optical waveguide plate 20 may be immersed in an acidic solution to perform the ultrasonic washing.

In the ashing treatment, for example, gaseous phase oxygen atoms are generated by means of the electron-impact dissociation based on the use of plasma. Subsequently, the oxygen atoms are reacted with the unnecessary organic matters remaining on the surface of the optical waveguide plate 20 to obtain volatile products. The volatile products are discharged from the interior of the treating apparatus (plasma asher). Thus, the organic matters are volatilized and removed.

Ozonolysis is exemplified as another example of the ashing treatment. The organic matters are reacted with ozone to produce volatile products by heat-treating the optical waveguide plate 20 in an ozone atmosphere, or by radiating the far infrared radiation onto the optical waveguide plate 20 in an ozone atmosphere. The heat treatment and the far infrared radiation may be performed simultaneously.

When the light-shielding layer 60 is composed of an organic matter, Step SB62 for removing organic matters is performed under the condition in which the light-shielding layer 60 is not removed, and the organic matters, which are present on the end surface of the optical waveguide plate 20 opposed to the picture element assembly 30, are removed. It is a matter of course that Step SB62 for removing organic matters can be omitted when a material, with which no unnecessary organic matter remains, is used for the constitutive material for the light-shielding layer 60.

After that, if necessary, the adhesion suppressant is selectively applied to portions of the optical waveguide plate 20 opposed to the transparent layer 54 in next Step SB63. Those usable as the adhesion suppressant include, for example, rain X (produced by PENNZOIL-QUAKER STATE) and KS-9001 (produced by Shin-Etsu Silicones). Alternatively, preferably, a preparation, which is obtained by mixing 0.5% to 20% of dimethyl silicone oil (5 mm$^2$/s to 3000 mm$^2$/s) with rain X or KS-9001, is applied, since the adhesion-suppressive effect is enhanced for the picture element assembly 30 and the optical waveguide plate 20.

Subsequently, in Step SB64 (see FIG. 14), a crosspiece adhesive 64 is applied to the light-shielding layer 60 formed on the optical waveguide plate 20. The application method is exemplified by the film formation methods as described above.

The hardness, the heat resistance, and the strength are enhanced in the case of the crosspiece adhesive 64 as compared with an adhesive containing no filler 62. Preferred examples of the filler 62 include high strength substances such as ceramics, plastic, and glass. Such a high strength substance reliably supports the optical waveguide plate 20.

It is preferable that the ratio of the filler 62 in the crosspiece adhesive 64 is 0.1 to 50% by weight. If the ratio is less than 0.1% by weight, the effect is inferior to improve the hardness, the heat resistance, and the strength. If the ratio exceeds 50% by weight, the adhesive ability is inferior, because the ratio of the thermosetting resin is low. More preferably, the ratio of the filler 62 is 5 to 30% by weight.

The curing component (resin) of the crosspiece adhesive 64 is not specifically limited. However, preferred examples of the curing component include, for example, thermoplastic resin, thermosetting resin, photocurable resin, moisture-curable resin, and cold setting resin.

Specifically, for example, there are exemplified acrylic resin, modified acrylic resin, epoxy resin, modified epoxy resin, silicone resin, modified silicone resin, vinyl acetate resin, ethylene-vinyl acetate copolymer resin, vinyl butyral resin, cyanoacrylate resin, urethane resin, polyimide resin, methacrylic resin, modified methacrylic resin, polyolefin resin, special silicone modified polymer, polycarbonate resin, natural rubber, and synthetic rubber.

Especially, it is preferable to use vinyl butyral resin, acrylic resin, modified acrylic resin, epoxy resin, modified epoxy resin, or a mixture of two or more of them, because they are excellent in adhesion strength. Among them, it is preferable to use epoxy resin, modified epoxy resin, or a mixture of them.

Figure 14:
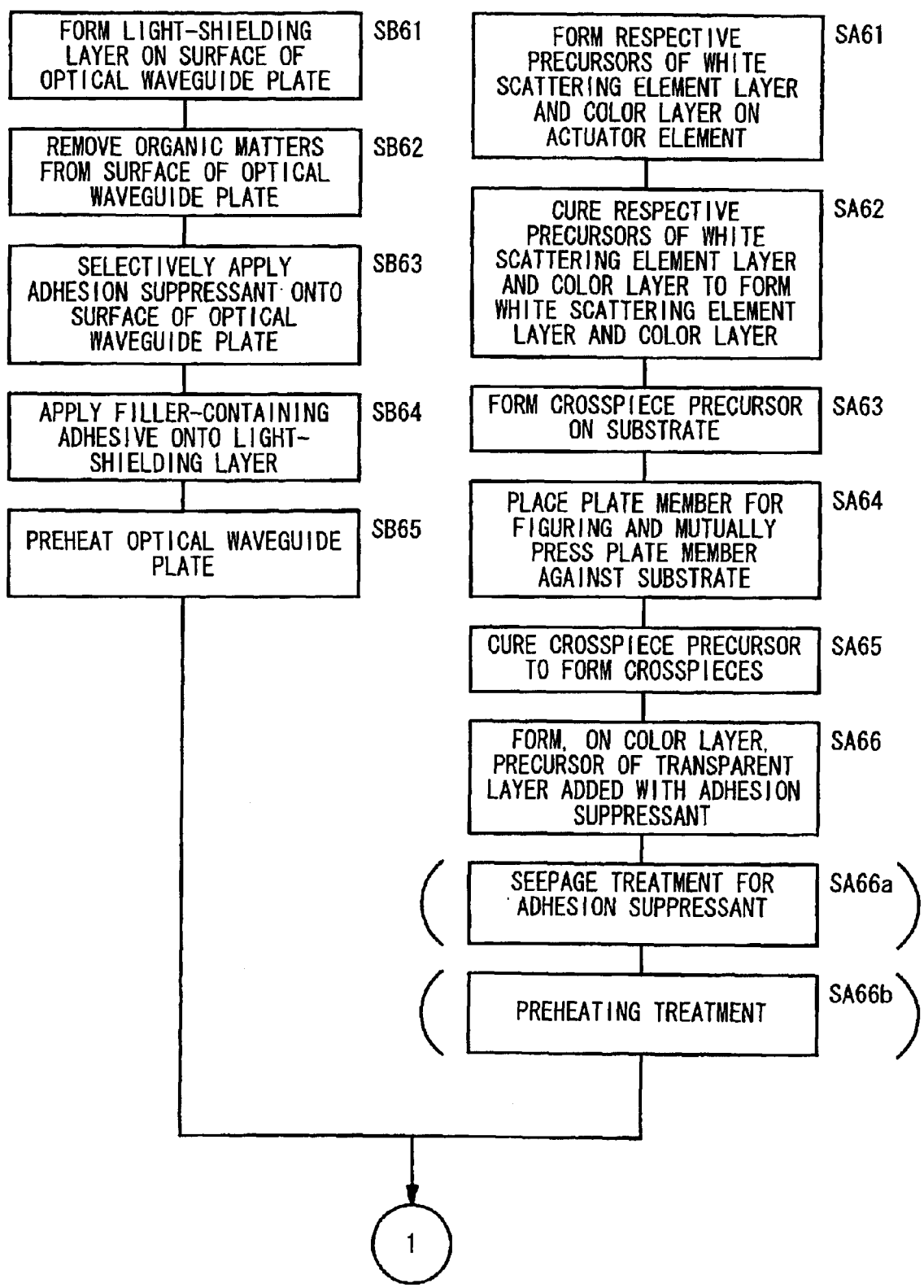
FIG. 14 shows a block diagram (No. 1) illustrating steps of the production method according to an embodiment of the present invention.

The crosspiece adhesive 64 is slightly cured by preliminarily heating the optical waveguide plate 20 in next Step SB65 (see FIG. 14).

Figure 13:
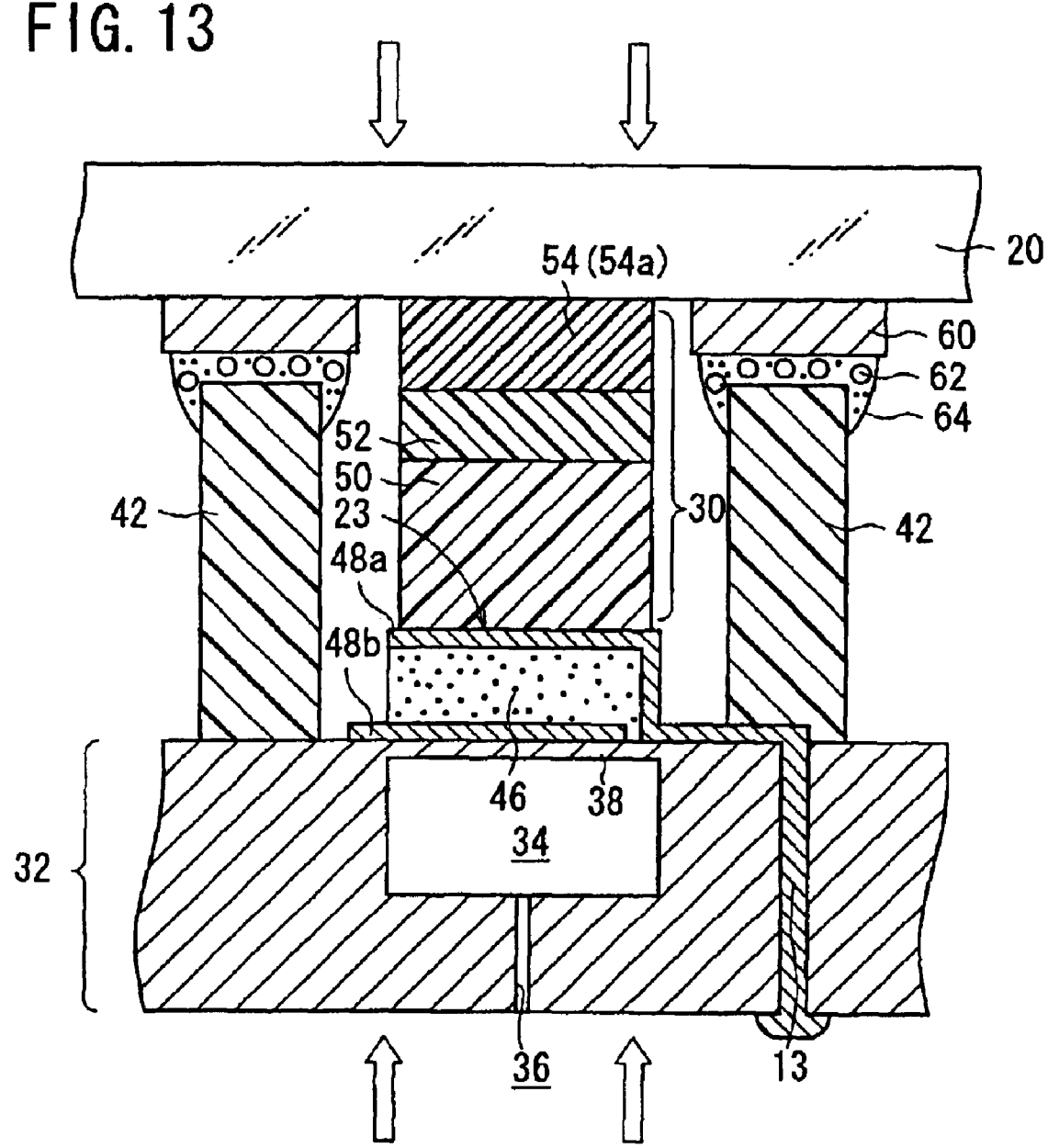
FIG. 13 shows the process progress illustrating a state in which the optical waveguide plate is joined onto the crosspieces.

Subsequently, in Step SC61 (see FIG. 15), as shown in FIG. 13, the optical waveguide plate 20 is superimposed on the crosspieces 42 so that the light-shielding layers 60 are placed on the crosspieces 42. The actuator substrate 32 and the optical waveguide plate 20 are joined to one another, for example, by means of the vacuum packaging method with the crosspieces 42, the crosspiece adhesive 64, and the transparent layer precursor 54a intervening therebetween.

After that, in Step SC62 (see FIG. 15), a voltage is applied to the actuator elements 22 to further cure the crosspiece adhesive 64 and cure the transparent layer precursor 54a at room temperature in a state in which the actuator elements 22 are displaced or driven in the direction toward the actuator substrate 32.

Subsequently, in Step SC63 (see FIG. 15), the transparent layer precursor 54a is further cured to form the transparent layer 54 by performing a heating treatment at a temperature higher than room temperature in the state in which the actuator elements 22 are displaced or driven in the direction toward the actuator substrate 32. It is preferable that the heating treatment is performed at a temperature of not less than 60° C. for not less than 1 hour, and more preferably for not less than 10 hours.

Figure 15:
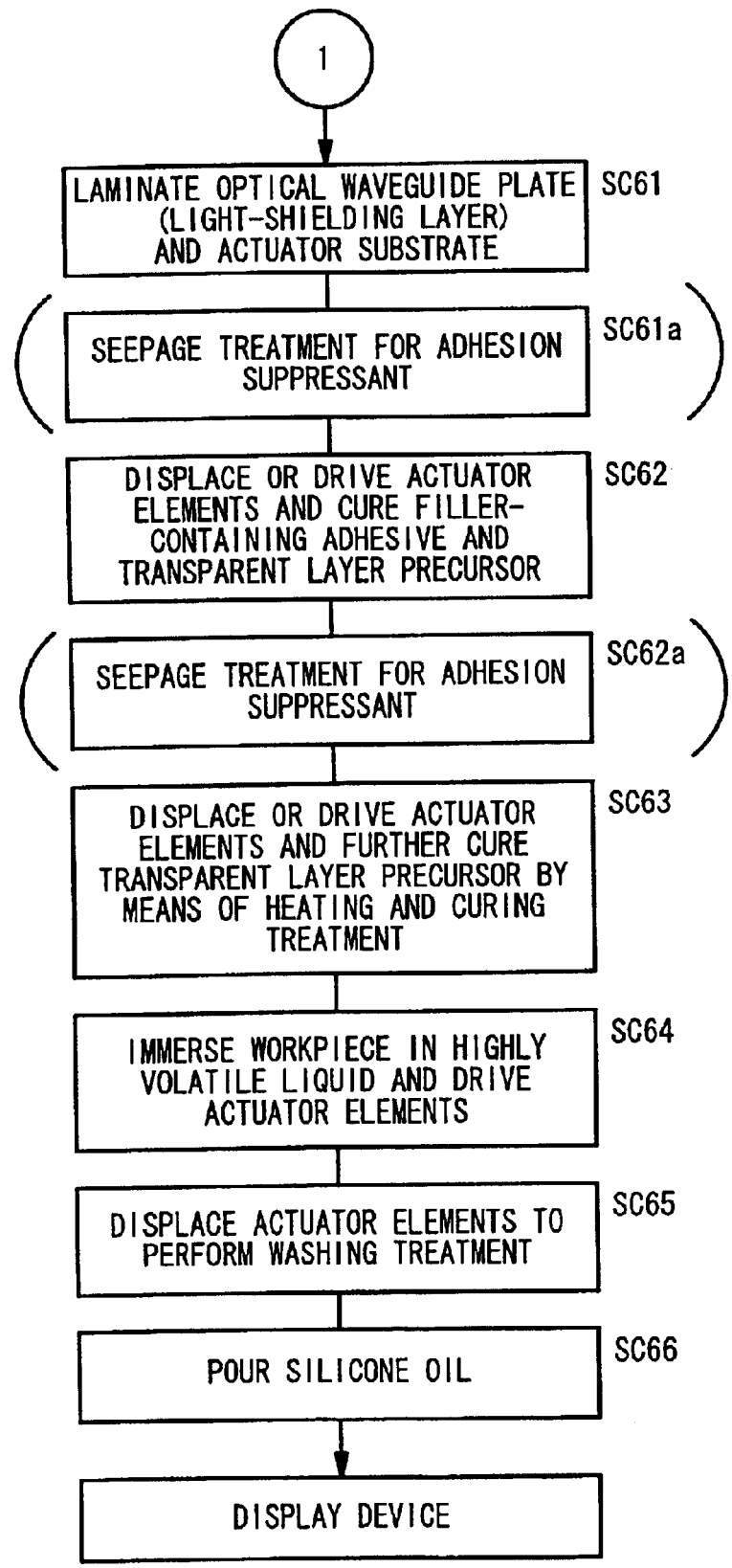
FIG. 15 shows a block diagram (No. 2) illustrating steps of the production method according to the embodiment of the present invention.

In the production method according to the embodiment of the present invention, as illustrated in parentheses in FIGS. 14 and 15, the seepage treatment for the adhesion suppressant is performed at an arbitrary timing in an arbitrary number of times (SA66a, SC61a, SC62a) after the step of forming the transparent layer precursor 54a (SA66), after the step of laminating the optical waveguide plate 20 and the actuator substrate 32 (SC61), and after the step of curing the transparent layer precursor 54a at room temperature (SC62).

The seepage treatment for the adhesion suppressant includes a method based on the heating, a method based on the application of vibration, and a method based on the combination of both methods. The seepage of the adhesion suppressant remaining in the transparent layer precursor 54a is further facilitated by applying the vibration or the heat, and thus the adhesion suppressant seeps out more promptly.

The method based on the heating is preferably performed at a temperature of 40° C. to 50° C. for about 5 minutes to 1 hour. The method based on the application of vibration is effectively performed such that the transparent layer precursor 54a is vibrated by applying a voltage to the actuator elements 22 to vibrate the actuator elements 22 themselves. It is also effective to vibrate the actuator substrate 32 by using, for example, a vibrator.

For example, preferably, the seepage treatment for the adhesion suppressant based on the heating is performed respectively once (SA66a, SC61a) after the step of forming the transparent layer precursor 54a (SA66) and after the step of laminating the optical waveguide plate 20 and the actuator substrate 32 (SC61).

In the embodiment of the present invention, the preheating treatment is performed for the transparent layer precursor 54a (SA66b) prior to the step of curing the transparent layer precursor 54a. Specifically, the preheating treatment is performed between the seepage treatment step (SA66a) for the adhesion suppressant to be performed after the step (SA66) of forming the transparent layer precursor 54a and the step (SC61) of laminating the optical waveguide plate 20 and the actuator substrate 32. As for the treatment condition in the preheating step, it is adequate to perform the heat treatment at 30 to 60° C. for about 5 minutes to 1 hour.

Explanation will now be made with reference to FIGS. 17A to 17C for the difference between a case in which the preheating step is not performed and a case in which the preheating step is performed.

Figure 17A:
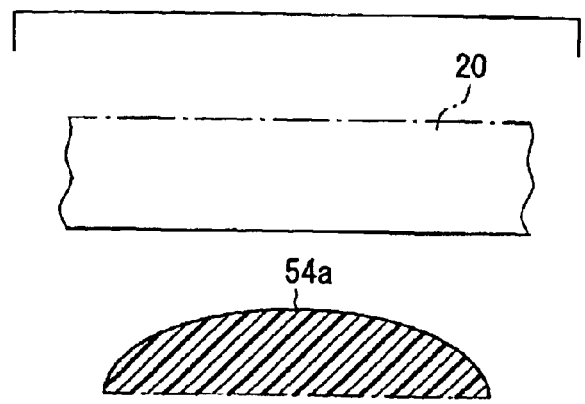
FIG. 17A illustrates parts of the optical waveguide plate and the transparent layer precursor in the process for joining the optical waveguide plate and the actuator substrate.
Figure 17B:
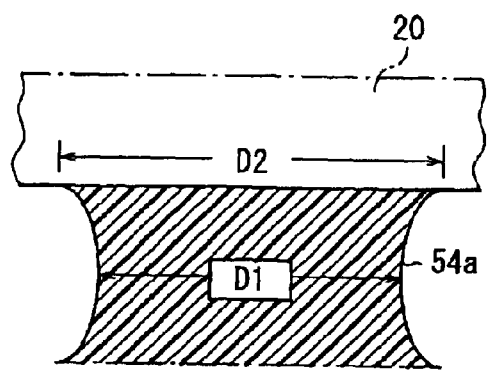
FIG. 17B illustrates a joined state of the optical waveguide plate and the transparent layer precursor when no preheating treatment is performed for the transparent layer precursor.

At first, as for the case in which the preheating step is not performed, as shown in FIGS. 17A and 17B, the shape of the transparent layer precursor 54a is established to have the affinity with respect to the optical waveguide plate 20 at the stage at which the optical waveguide plate 20 and the actuator substrate 32 are joined to one another. Specifically, as shown in FIG. 17B, for example, the width D2 of a portion contacting with the optical waveguide plate 20 is larger than the width D1 of a central portion of the transparent layer precursor 54a, giving a sucker-like shape with respect to the optical waveguide plate 20. Therefore, in the case of this shape, the transparent layer precursor 54a is hardly separated from the optical waveguide plate 20.

Figure 17C:
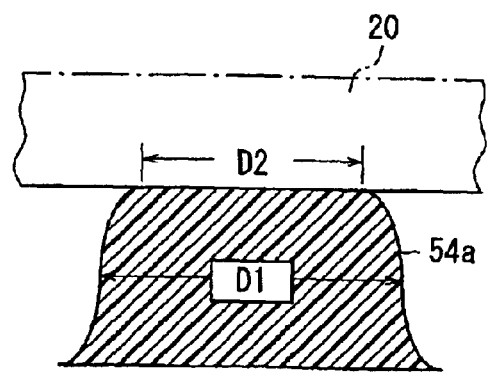
FIG. 17C illustrates a joined state of the optical waveguide plate and the transparent layer precursor when a preheating treatment is performed for the transparent layer precursor.

As for the case in which the preheating step is performed, as shown in FIGS. 17A and 17C, the shape of the transparent layer precursor 54a is established to have the incompatibility with respect to the optical waveguide plate 20 at the stage at which the optical waveguide plate 20 and the actuator substrate 32 are joined to one another. Specifically, as shown in FIG. 17C, for example, the width D2 of a portion contacting with the optical waveguide plate 20 is smaller than the width D1 of a central portion of the transparent layer precursor 54a, making it possible to avoid the sucker-like shape as described above. Therefore, in the case of this shape, the transparent layer precursor 54a is easily separated from the optical waveguide plate 20.

The curing level of the transparent layer precursor 54a can be adjusted in the preheating step. The shape of the transparent layer precursor 54a can be controlled to be the shape with which the transparent layer precursor 54a is easily separated from the optical waveguide plate 20 at the stage at which the optical waveguide plate 20 and the actuator substrate 32 are joined to one another. Therefore, after the display device 10 is completed, it is possible to improve the response performance of the contact/separation of the picture element assembly 30 with respect to the optical waveguide plate 20.

Figure 18:
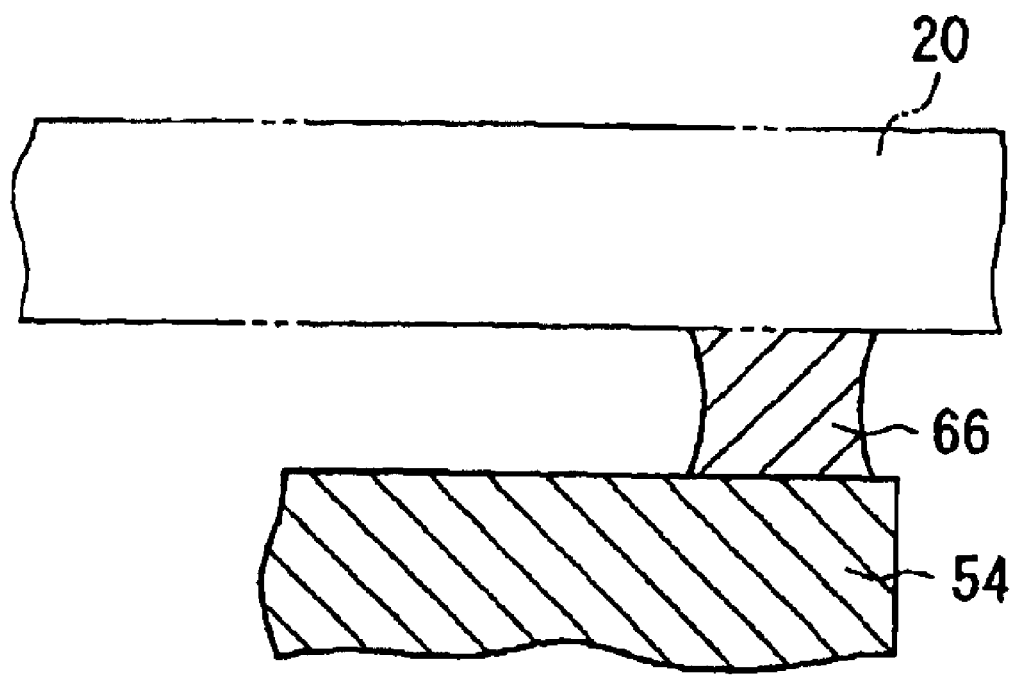
FIG. 18 illustrates a state in which the transparent layer and the optical waveguide plate are bridged by the adhesion suppressant.

When the adhesion suppressant added to the transparent layer 54 seeps out in a large amount, for example, as shown in FIG. 18, the adhesion suppressant 66 may be locally in a bridged state at a portion at which the spacing distance between the upper end surface of the transparent layer 54 and the optical waveguide plate 20 is narrow when the transparent layer 54 is separated, and any white dot defect as well as any bright defect may be caused on the image display.

In view of the above, in the embodiment of the present invention, the washing treatment is performed for the adhesion suppressant 66. At first, the pretreatment is performed. In Step SC64 shown in FIG. 15, the workpiece before the completion as the display device 10 is immersed in a highly volatile liquid (for example, siloxane or florinate), and the actuator elements 22 are driven. Accordingly, the adhesion suppressant 66 having the high viscosity and the highly volatile liquid having the low viscosity are forcibly mixed with each other. The washing is reliably performed thereafter.

After that, in the washing step of Step SC65, the highly volatile liquid is poured through the gap between the optical waveguide plate 20 and the actuator substrate 32 to perform the washing (for example, the removal of the adhesion suppressant 66) in a state in which the actuator elements 22 are displaced by applying a voltage thereto, i.e., in a state in which the gap is provided between the picture element assemblies 30 and the optical waveguide plate 20. The following methods are also available as the specified washing method. The centrifugal force of a spinner or the like is utilized. The vacuum evacuation is effected from the side opposite to the side on which the highly volatile liquid is poured. Further, the air is blown to scatter any unnecessary adhesion suppressant 66 and any washing liquid.

By the way, the adhesion suppressant 66 is lost by the washing treatment after the washing step SC65 described above. If this state is maintained, the release performance may be deteriorated at the interface between the picture element assembly 30 and the optical waveguide plate 20, resulting in the deterioration of the response characteristics of the contact/separation of the picture element assembly 30 with respect to the optical waveguide plate 20, or resulting in the occurrence of any luminance deficiency.

In view of the above, in the embodiment of the present invention, the adhesion suppressant, for example, silicone oil is poured (Step SC66) into the space between the picture element assembly 30 and the optical waveguide plate 20 after the washing step SC65. Specifically, a minute amount of silicone oil is mixed with a highly volatile liquid to prepare a liquid. The entire workpiece is immersed in the liquid to allow the liquid to soak into the interface between the picture element assembly 30 and the optical waveguide plate 20.

After allowing the liquid to sufficiently penetrate into the interface, the liquid is removed, for example, by utilizing the centrifugal force of a spinner, by effecting the vacuum evacuation, or by blowing the air. According to this method, it is possible to allow an appropriate amount of silicone oil to remain only at the interface with respect to the picture element assembly 30 at which the spacing distance with respect to the optical waveguide plate 20 is extremely narrow as compared with other portions. Thus, it is possible to recover the release performance of the picture element assembly 30. In this procedure, the amount of silicone oil to be poured can be adjusted by adjusting the mixing ratio with respect to the highly volatile liquid.

The poured silicone oil has such an effect that the concave/convex structure or the irregularities on the surface of the picture element assembly 30 are filled therewith upon the ON operation (light emission) of the picture element, which contributes to the increase in contact area with respect to the optical waveguide plate 20. Therefore, an effect is also obtained to improve the luminance upon light emission, in addition to the improvement in response performance of the contact/separation of the picture element assembly 30.

The release performance can be recovered at the interface between the picture element assembly 30 and the optical waveguide plate 20 by pouring silicone oil into the space between the picture element assembly 30 and the optical waveguide plate 20 after the washing step SC65. It is possible to avoid the occurrence of the luminance defect and the deterioration of the response characteristics of the contact/separation of the picture element assembly 30 with respect to the optical waveguide plate 20 as described above.

The display device 10 is completed at the stage at which Step SC66 comes to an end. After that, for example, the inspection step is performed, and then the display device 10 is utilized, for example, to construct the large screen display 100 shown in FIG. 1.

As described above, the display device 10 according to the embodiment of the present invention is constructed such that the transparent layer 54 of the picture element assembly 30, which makes the contact/separation with respect to the optical waveguide plate 20, contains the major component of the cured resin obtained by the polymerization with the principal ingredient which is composed of one or more materials selected from modified epoxy, bisphenol A type epoxy, bisphenol F type epoxy, and glycidyl ether type epoxy, and the curing agent which is composed of one or more materials selected from modified polyamine, modified alicyclic polyamine, and heterocyclic diamine modified product of tertiary amine. Therefore, the heat resistance of the picture element assembly 30 is improved. Accordingly, the response performance of the contact/separation with respect to the optical waveguide plate 20 is improved, and it is possible to enhance the stability of the image display.

Figure 19A:
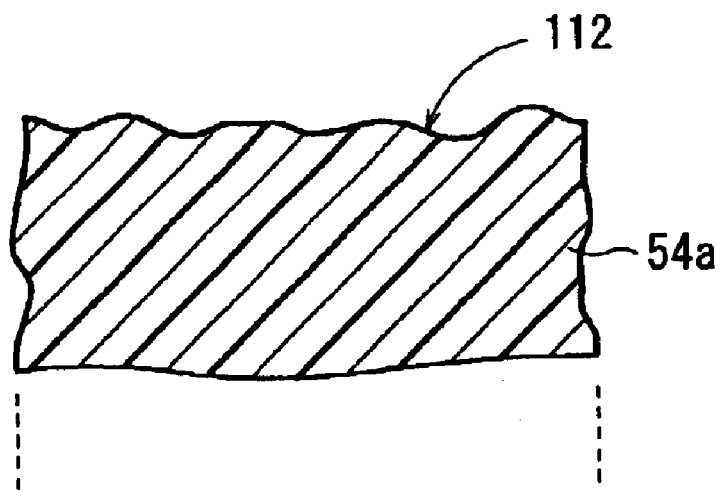
FIG. 19A is a sectional view illustrating a state in which the upper end surface of the transparent layer precursor is a rough surface.
Figure 19B:
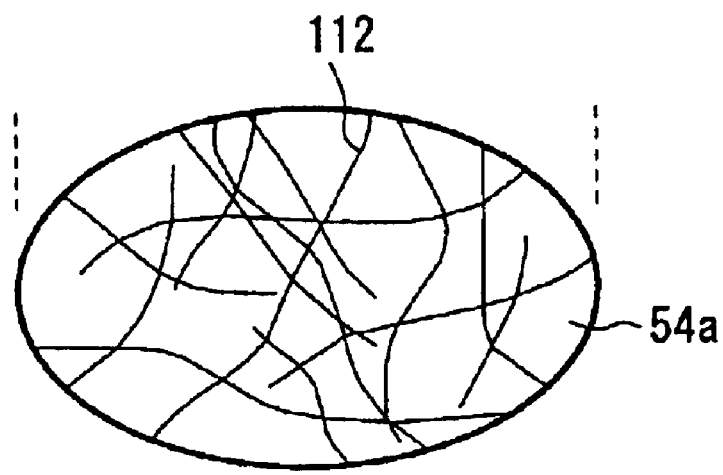
FIG. 19B is a top view illustrating the upper end surface of the transparent layer precursor.
Figure 20:
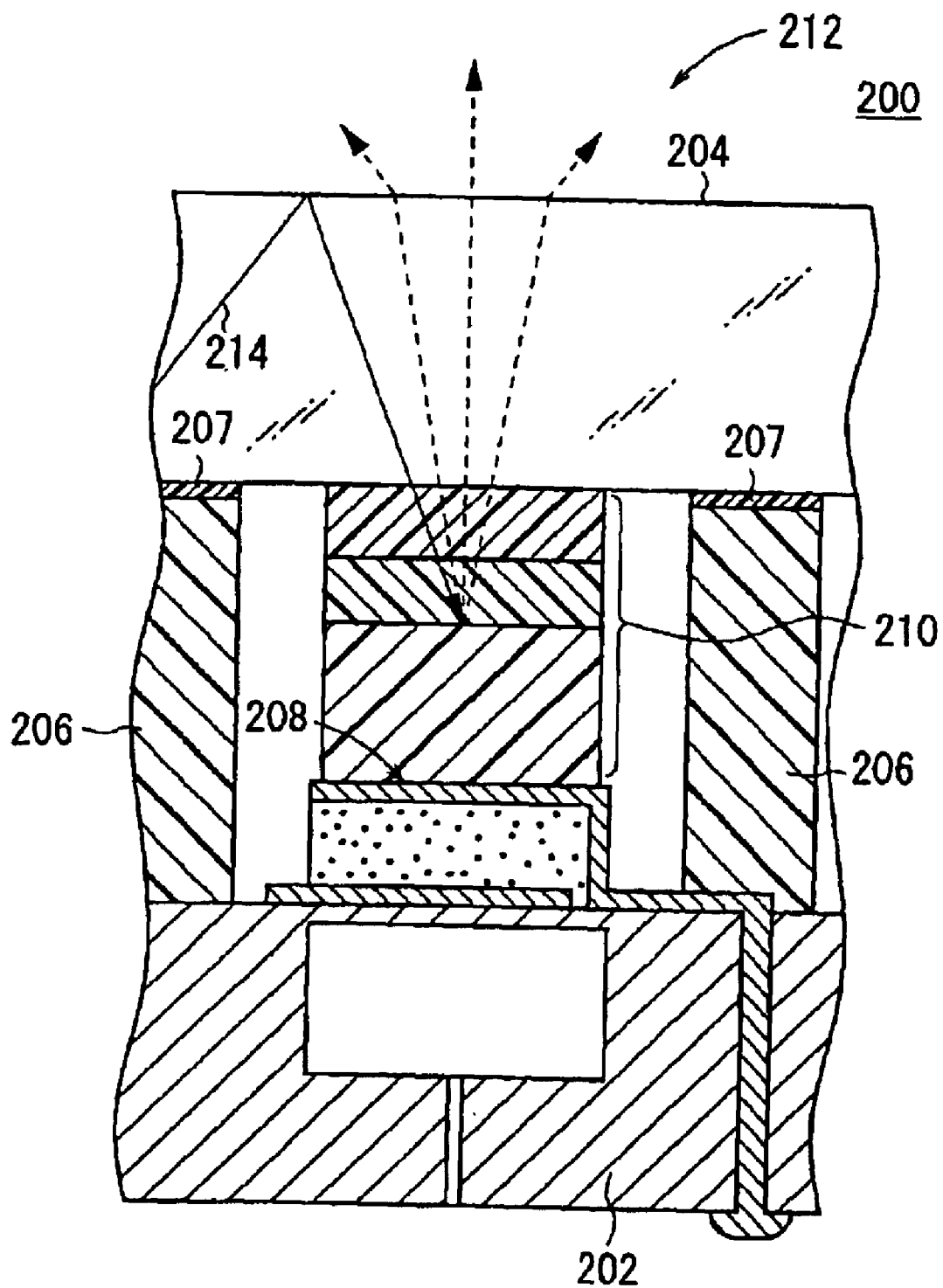
FIG. 20 shows, with partial omission, an arrangement of a suggested display device in the exemplary conventional technique.

In the embodiment of the present invention, the adhesion suppressant is contained in the cured resin for constructing the transparent layer 54. Therefore, it is possible to avoid such a phenomenon that the transparent layer 54 continues the adhesion to the optical waveguide plate 20. Especially, silicone grease and silicone oil are contained as the adhesion suppressant to be added to the transparent layer precursor 54a. Therefore, silicone grease having the high viscosity consequently floats to upper portions of the transparent layer precursor 54 when the adhesion suppressant seeps out. As shown in FIGS. 19A and 19B, the wrinkle-shaped concave/convex structure or the irregularities 112 are easily formed on the upper end surface of the transparent layer precursor 54a.

When the upper surface of the transparent layer 54 is a rough surface, the adhesion suppressant is consequently collected in recesses. Even when the amount of the adhesion suppressant is large, the bridging phenomenon as shown in FIG. 18 is not caused. Further, the adhesion suppressant effectively fills any gaps with respect to the optical waveguide plate 20 brought about by the irregularities on the upper end surface of the transparent layer 54. Therefore, when the display device 10 is in the light emission state, the upper end surface of the transparent layer 54 reliably abuts against the optical waveguide plate 20. Therefore, it is easier to allow the display device 10 to make light emission at a desired luminance.

The surface shape (especially the shape of the surface opposed to the optical waveguide plate 20) of the picture element assembly 30 will now be considered. When the thixotropy of silicone grease in the adhesion suppressant to be added is high, the leveling hardly occurs after the seepage into the interface. There is a tendency that the shape is maintained exactly in the state of seepage to the surface. Therefore, the concave/convex structure tends to be formed. The surface shape is formed in such a way that the concave/convex structure is transferred to the surface of the picture element assembly 30. Accordingly, it is possible to improve the response performance of the contact/separation of the picture element assembly 30 with respect to the optical waveguide plate 20.

As for the silicone oil, the leveling hardly occurs when the viscosity is high. An equivalent effect is obtained such that the concave/convex structure is formed more uniformly over the entire interface between the picture element assembly 30 and the optical waveguide plate 20. However, silicone oil tends to remain as residual matter on the optical waveguide plate 20 in the washing step to be performed thereafter. Therefore, the viscosity of silicone oil may be selected while considering the balance between the response performance of the contact/separation depending on the surface shape of the picture element assembly 30 and the degree of occurrence of the white defect on the display depending on the residual matter.

When the viscosity of the silicone oil to be added is further lowered, the adhesion suppressant, which has seeped out, tends to undergo aggregation and leveling. As a result, any deviation arises in the concave/convex structure of the surface shape of the picture element assembly 30, and/or the flat portion having no concave/convex structure is increased. Therefore, the response performance of the contact/separation may be lowered.

Therefore, it is preferable to use dimethyl silicone oil having a viscosity of 5 mm$^2$/s to 3000 mm$^2$/s as the silicone oil described above. In this case, the effect to suppress the adhesion is improved. It is easy to remove the adhesion suppressant adhered to the optical waveguide plate 20 in the washing step. It is possible to suppress the occurrence of the bright defect and the white defect on the display.

In the production method according to the embodiment of the present invention, the seepage treatment is performed for the adhesion suppressant at an arbitrary timing in an arbitrary number of times after the step of forming the transparent layer precursor 54a (SA66), after the step of laminating the optical waveguide plate 20 and the actuator substrate 32 (SC61), and after the step of curing the transparent layer precursor 54a at room temperature (SC62). It is easy to seize an opportunity to cause the seepage of the adhesion suppressant dispersed in the transparent layer precursor 54a. Thus, it is possible to facilitate the seepage.

In the embodiment of the present invention, the transparent layer precursor 54a is heated and cured at a temperature higher than room temperature while allowing the adhesion suppressant to be interposed at the interface between the transparent layer precursor 54a and the optical waveguide plate 20 after curing the transparent layer precursor 54a at room temperature. The primary curing is completed in the curing step at room temperature, and thus it is possible to suppress any sudden softening and any leveling of the resin and the adhesion suppressant during the heating treatment to be performed thereafter.

The adhesion suppressant, which has seeped out to the interface between the transparent layer precursor 54a and the optical waveguide plate 20 until the curing step at room temperature, is allowed to remain as it is even during the heating treatment, with which the adhesion suppressant subjected to the seepage by the heating treatment is combined, and thus it is possible to obtain, after the heating treatment as well, the same concave/convex structure as the concave/convex structure of the surface of the transparent layer precursor 54a obtained upon the curing at room temperature.

When the series of heating treatments are performed as described above, then the adhesion suppressant is progressively separated from the organic resin for constructing the transparent layer precursor 54a as compared with a case in which only the curing step at room temperature is performed, and the adhesion suppressant remaining in the transparent layer precursor 54a is decreased. Therefore, when the actuator elements 22 are driven thereafter, it is possible to decrease the amount of the adhesion suppressant which seeps out from the picture element assemblies 30 as a result of the contact/separation of the picture element assemblies 30 with respect to the optical waveguide plate 20. Thus, it is possible to suppress the fluctuation of the white defect level on the display.

Further, the following subsidiary effect is obtained. It is possible to decrease the amount of addition of the adhesion suppressant itself to be added to the transparent layer precursor 54a. This feature is also advantageous in view of the cost.

In the pretreatment for the washing step, the entire workpiece is immersed in the highly volatile liquid, and the actuator elements 22 are driven in the state of immersion. Therefore, the adhesion suppressant having the high viscosity and the highly volatile liquid having the low viscosity are mixed by force with each other. The adhesion suppressant is easily removed when the washing is performed thereafter by pouring the highly volatile liquid through the gap between the optical waveguide plate 20 and the actuator substrate 32.

When the step, in which the voltage is previously applied to the actuator elements 22 to separate the picture element assemblies 30 from the optical waveguide plate 20, is added before driving the actuator elements 22 in the state of immersion as described above, then the washing can be reliably performed for the picture element assemblies 30, and it is possible to effectively suppress the occurrence of the white defect and the bright defect on the display.

Also in the washing step to be performed thereafter, the washing effect is improved by performing the washing in the state in which the actuator elements 22 are displaced by applying the voltage thereto, i.e., in the state in which the gap is provided between the picture element assemblies 30 and the optical waveguide plate 20. Therefore, the adhesion suppressant, which has become difficult to be removed as a result of heating, can be reliably removed. Thus, it is possible to suppress the occurrence of the white defect and the bright defect on the display.

It is a matter of course that the display device and the method for producing the same according to the present invention are not limited to the embodiments described above, which may be embodied in other various forms without deviating from the gist or essential characteristics of the present invention.

What is claimed is:

1. A display device comprising a substrate which has actuator elements, an optical waveguide plate, crosspieces which is interposed between said optical waveguide plate and said substrate and which surround said actuator elements, and picture element assemblies which are joined onto said actuator elements, wherein said picture element assembly includes a layer containing a major component of a cured resin obtained by polymerization with a principal ingredient which is composed of one or more materials selected from modified epoxy, bisphenol A type epoxy, bisphenol F type epoxy, and glycidyl ether type epoxy, and a curing agent which is composed of one or more materials selected from modified polyamine, modified alicyclic polyamine, and heterocyclic diamine modified product of tertiary amine.

2. The display device according to claim 1, wherein said picture element assembly includes a layer containing said major component of said cured resin obtained by said polymerization with said principal ingredient which is composed of one or more materials selected from modified epoxy and bisphenol A type epoxy, and said curing agent which is composed of one or more materials selected from modified polyamine and modified alicyclic polyamine, or a layer containing said major component of said cured resin obtained by said polymerization with said principal ingredient which is composed of bisphenol F type epoxy or a mixture of bisphenol F type epoxy and glycidyl ether type epoxy, and said curing agent which is composed of modified polyamine or heterocyclic diamine modified product of tertiary amine.

3. The display device according to claim 1, wherein a part of said layer is opposed to said optical waveguide plate.

4. The display device according to claim 1, wherein an adhesion suppressant is contained in said cured resin.

5. The display device according to claim 4, wherein a precursor of said cured resin is defined as a resin precursor; and said resin precursor and said adhesion suppressant are contained in said layer in a blending rate of 1:0.01 to 1:0.2 as represented by weight ratio.

6. The display device according to claim 4, wherein said adhesion suppressant contains silicone grease and/or silicone oil.

7. The display device according to claim 6, wherein said silicone grease and said silicone oil are contained in a blending rate of 1:0.1 to 0:1 as represented by weight ratio.

8. The display device according to claim 6, wherein said silicone grease contains an inorganic filler.

9. The display device according to claim 6, wherein said silicone oil is dimethyl silicone oil having a viscosity of 5 $mm^2/s$ to 3000 $mm^2/s$.

10. The display device according to claim 1, wherein an anti-foaming agent is contained in said cured resin.

11. A method for producing a display device comprising a substrate which has actuator elements, an optical waveguide plate, crosspieces which is interposed between said optical waveguide plate and said substrate and which surround said actuator elements, and picture element assemblies which are joined onto said actuator elements, said method comprising:

a step of preparing a picture element assembly precursor containing a mixture composed of one or more principal ingredients selected from modified epoxy, bisphenol A type epoxy, bisphenol F type epoxy, and glycidyl ether type epoxy, and one or more curing agents selected from modified polyamine, modified alicyclic polyamine, and heterocyclic diamine modified product of tertiary amine;

a step of patterning said picture element assembly precursor;

a step of joining said optical waveguide plate and said substrate; and a step of curing said picture element assembly precursor to form said picture element assembly.

12. The method for producing said display device according to claim 11, wherein said step of preparing said picture element assembly precursor is performed to prepare a picture element assembly precursor containing said mixture composed of one or more principal ingredients selected from modified epoxy and bisphenol A type epoxy, and one or more curing agents selected from modified polyamine and modified alicyclic polyamine, or a picture element assembly precursor containing said mixture composed of said principal ingredient of bisphenol F type epoxy or a mixture of bisphenol F type epoxy and glycidyl ether type epoxy, and said curing agent of modified polyamine or heterocyclic diamine modified product of tertiary amine.

13. The method for producing said display device according to claim 11, further comprising a step of preheating said picture element assembly precursor prior to said step of curing said picture element assembly precursor.

14. The method for producing said display device according to claim 11, wherein said step of curing said picture element assembly precursor includes a step of curing said picture element assembly precursor at room temperature, and a step of heating and curing said picture element assembly precursor at a temperature higher than said room temperature.

15. The method for producing said display device according to claim 14, wherein said step of curing said picture element assembly precursor at said room temperature and said step of heating and curing said picture element assembly precursor are performed while displacing or driving said actuator elements by applying a voltage to said actuator elements.

16. The method for producing said display device according to any one of claim 11, wherein
said picture element assembly precursor contains an adhesion suppressant, and said method further comprises:
a step of allowing said adhesion suppressant to seep out.

17. The method for producing said display device according to claim 16, wherein said step of allowing said adhesion suppressant to seep out is performed by applying at least heat and/or vibration.

18. The method for producing said display device according to claim 16, wherein said step of allowing said adhesion suppressant to seep out is performed after said step of patterning said picture element assembly precursor, and/or after said step of joining said optical waveguide plate and said substrate, and/or during said step of curing said picture element assembly precursor.

19. The method for producing said display device according to claim 16, wherein said step of heating and curing said picture element assembly precursor is started without washing said adhesion suppressant which seeps out from said picture element assembly precursor.

20. The method for producing said display device according to claim 16, further comprising a step of washing said adhesion suppressant which seeps out from said picture element assembly.

21. The method for producing said display device according to claim 20, wherein a pretreatment for said washing step is performed such that a workpiece is immersed in a highly volatile liquid and said actuator elements are driven.

22. The method for producing said display device according to claim 20, wherein said washing step is performed while displacing said actuator elements by applying a voltage to said actuator elements.

23. The method for producing said display device according to claim 20, further comprising a step of pouring said adhesion suppressant into a space between said picture element assemblies and said optical waveguide plate after said washing step.

* * * * *

UNITED STATES PATENT AND TRADEMARK OFFICE
CERTIFICATE OF CORRECTION

PATENT NO.         : 6,798,959 B2
APPLICATION NO. : 10/230869
DATED                : September 28, 2004
INVENTOR(S)       : Yukihisa Takeuchi et al.

It is certified that error appears in the above-identified patent and that said Letters Patent is hereby corrected as shown below:

Column 1

Line 21, Change "is" to -- are --

Column 3

Line 51, Change "is" to -- are --

Column 5

Line 20, Change "is" to -- are --

Column 12

Line 23, Change "layers" to -- layer --

Column 13

Line 57, Change "emitting" to -- emits --

Column 14

Line 61, Change "used" to -- use --

Column 18

Line 41, Delete "any" and Change "remains" to -- may remain --

Column 22

Line 28, Delete "the"

Line 30, Delete "By the way, the" and add -- The -- before "adhesion"

UNITED STATES PATENT AND TRADEMARK OFFICE
CERTIFICATE OF CORRECTION

PATENT NO. : 6,798,959 B2
APPLICATION NO. : 10/230869
DATED : September 28, 2004
INVENTOR(S) : Yukihisa Takeuchi It is certified that error appears in the above-identified patent and that said Letters Patent is hereby corrected as shown below:

Column 24

Line 27, Delete "any"; Change "deviation" to -- deviations -- and Change "arises" to -- arise --

Column 25

Line 61, Delete "which is"

Column 26

Line 49, Delete "which is"

Signed and Sealed this

Fifth Day of December, 2006

JON W. DUDAS
*Director of the United States Patent and Trademark Office*